US007773715B2

(12) United States Patent
Westfield et al.

(10) Patent No.: US 7,773,715 B2
(45) Date of Patent: Aug. 10, 2010

(54) TWO WIRE TRANSMITTER WITH ISOLATED CAN OUTPUT

(75) Inventors: Brian Lee Westfield, Victoria, MN (US); Kelly Michael Orth, Apple Valley, MN (US)

(73) Assignee: Rosemount Inc., Eden Prairie, MN (US)

( * ) Notice: Subject to any disclaimer, the term of this patent is extended or adjusted under 35 U.S.C. 154(b) by 1871 days.

(21) Appl. No.: 10/812,192

(22) Filed: Mar. 29, 2004

(65) Prior Publication Data

US 2004/0184517 A1 Sep. 23, 2004

Related U.S. Application Data

(63) Continuation-in-part of application No. 10/236,874, filed on Sep. 6, 2002, now Pat. No. 7,109,883.

(51) Int. Cl.
*H04L 23/00* (2006.01)
(52) U.S. Cl. .................. 375/377; 375/219; 340/870.16; 340/870.18; 455/69
(58) Field of Classification Search .................. 375/219, 375/377; 340/870.16, 870.18; 455/69
See application file for complete search history.

(56) References Cited

U.S. PATENT DOCUMENTS

| 3,701,280 A | 10/1972 | Stroman | 73/194 |
|---|---|---|---|
| 3,742,450 A | 6/1973 | Weller | 375/257 |
| 3,968,694 A | 7/1976 | Clark | 73/398 |
| 4,120,206 A | 10/1978 | Rud, Jr. | 73/718 |
| 4,125,027 A | 11/1978 | Clark | 73/724 |
| 4,238,825 A | 12/1980 | Geery | 364/510 |
| 4,250,490 A | 2/1981 | Dahlke | 340/870.37 |
| 4,287,501 A | 9/1981 | Tominaga et al. | 338/42 |
| 4,414,634 A | 11/1983 | Louis et al. | 364/510 |
| 4,419,898 A | 12/1983 | Zanker et al. | 73/861.02 |
| 4,446,730 A | 5/1984 | Smith | 73/301 |
| 4,455,875 A | 6/1984 | Guimard et al. | 73/708 |
| 4,485,673 A | 12/1984 | Stern | 73/304 |

(Continued)

FOREIGN PATENT DOCUMENTS

DE 37 41 648 A1 7/1988

(Continued)

OTHER PUBLICATIONS

"Notification of Transmittal of the International Search Report and the Written Opinion of the International Searching Authority", PCT/US2006/046932.

(Continued)

*Primary Examiner*—Ted M Wang
(74) *Attorney, Agent, or Firm*—Westman, Champlin & Kelly, P.A.

(57) ABSTRACT

A process variable transmitter that preferably includes a transmitter output circuit that provides bidirectional HART and controller area network communication transceiver lines. The transmitter output circuit also includes sensor circuit interface contacts. An isolated circuit couples to the sensor circuit interface contacts. The isolated circuit includes sensor circuitry sensing a process variable. The isolated circuit further comprises a galvanic isolation barrier galvanically isolating the sensor circuitry from the HART and controller area network transceiver lines. A stacked power supply provides power management. Other aspects may include a controller area network current limiter diagnostic output, timed sequencing of microcontroller startup and shutdown, a local operator interface and power management.

5 Claims, 15 Drawing Sheets

U.S. PATENT DOCUMENTS

| | | | | |
|---|---|---|---|---|
| 4,528,855 A | 7/1985 | Singh .................... 73/721 |
| 4,562,744 A | 1/1986 | Hall et al. ............. 73/861.02 |
| 4,598,381 A | 7/1986 | Cucci .................... 364/558 |
| 4,602,344 A | 7/1986 | Ferretti et al. ............ 364/509 |
| 4,617,607 A | 10/1986 | Park et al. ................ 361/283 |
| D287,827 S | 1/1987 | Broden .................... D10/46 |
| 4,644,797 A | 2/1987 | Ichikawa et al. ............ 73/706 |
| 4,653,330 A | 3/1987 | Hedtke .................... 73/756 |
| 4,677,841 A | 7/1987 | Kennedy ................... 73/30 |
| 4,701,938 A | 10/1987 | Bell ........................ 375/257 |
| 4,745,810 A | 5/1988 | Pierce et al. ................ 73/706 |
| D296,995 S | 8/1988 | Lee ......................... D10/46 |
| D297,314 S | 8/1988 | Hedtke .................... D10/46 |
| D297,315 S | 8/1988 | Pierce et al. ............... D10/85 |
| 4,783,659 A | 11/1988 | Frick ..................... 340/870.37 |
| 4,791,352 A | 12/1988 | Frick et al. ................. 324/60 |
| 4,798,089 A | 1/1989 | Frick et al. ................. 73/706 |
| 4,818,994 A | 4/1989 | Orth et al. ............. 340/870.21 |
| 4,825,704 A | 5/1989 | Aoshima et al. ......... 73/861.42 |
| 4,833,922 A | 5/1989 | Frick et al. .................. 73/756 |
| 4,850,227 A | 7/1989 | Luettgen et al. .............. 73/708 |
| 4,866,989 A | 9/1989 | Lawless ..................... 73/756 |
| 4,881,412 A | 11/1989 | Northedge ............... 73/861.04 |
| 4,930,353 A | 6/1990 | Kato et al. .................. 73/727 |
| 4,958,938 A | 9/1990 | Schwartz et al. ............. 374/208 |
| 4,970,898 A | 11/1990 | Walish et al. ................ 73/706 |
| 4,980,675 A | 12/1990 | Meisenheimer, Jr. ......... 340/626 |
| 5,000,047 A | 3/1991 | Kato et al. .................. 73/706 |
| D317,266 S | 6/1991 | Broden et al. ............. D10/46 |
| D317,269 S | 6/1991 | Selg ....................... D10/52 |
| D318,432 S | 7/1991 | Broden et al. ............. D10/46 |
| 5,028,746 A | 7/1991 | Petrich .................. 191/12.2 R |
| 5,035,140 A | 7/1991 | Daniels et al. ................ 73/290 |
| 5,051,937 A | 9/1991 | Kawate et al. ............ 364/571.01 |
| 5,058,437 A | 10/1991 | Chaumont et al. ........ 73/861.21 |
| 5,060,108 A | 10/1991 | Baker et al. ................. 361/283 |
| 5,070,732 A | 12/1991 | Duncan et al. ................ 73/431 |
| 5,083,091 A | 1/1992 | Frick et al. ................... 324/678 |
| 5,087,871 A | 2/1992 | Losel ....................... 323/299 |
| 5,094,109 A | 3/1992 | Dean et al. ................... 73/718 |
| D329,619 S | 9/1992 | Cartwright ................. D10/52 |
| 5,142,914 A | 9/1992 | Kusakabe et al. ............. 73/723 |
| 5,157,972 A | 10/1992 | Broden et al. ................ 73/718 |
| 5,162,725 A | 11/1992 | Hodson et al. ............... 324/115 |
| 5,187,474 A * | 2/1993 | Kielb et al. ............. 340/870.18 |
| 5,212,645 A | 5/1993 | Wildes et al. ................ 364/463 |
| 5,227,782 A | 7/1993 | Nelson .................. 340/870.11 |
| 5,236,202 A | 8/1993 | Krouth et al. ................ 277/164 |
| 5,245,333 A | 9/1993 | Anderson et al. .......... 340/870.3 |
| 5,248,167 A | 9/1993 | Petrich et al. ................. 285/23 |
| D342,456 S | 12/1993 | Miller et al. ................. D10/60 |
| 5,276,631 A | 1/1994 | Popovic et al. ............ 364/571.04 |
| 5,287,746 A | 2/1994 | Broden ....................... 73/706 |
| 5,353,200 A | 10/1994 | Bodin et al. ................. 361/816 |
| 5,369,386 A | 11/1994 | Alden et al. ................. 335/206 |
| 5,377,547 A | 1/1995 | Kusakabe et al. ............. 73/723 |
| 5,381,355 A | 1/1995 | Birangi et al. ............. 364/724.01 |
| D358,784 S | 5/1995 | Templin, Jr. et al. .......... D10/96 |
| 5,436,824 A | 7/1995 | Royner et al. ................ 363/89 |
| 5,448,180 A | 9/1995 | Kienzler et al. ............... 326/15 |
| 5,469,150 A | 11/1995 | Sitte ..................... 340/825.07 |
| 5,471,885 A | 12/1995 | Wagner ................... 73/862.041 |
| D366,000 S | 1/1996 | Karas et al. ................ D10/60 |
| D366,218 S | 1/1996 | Price et al. ................. D10/52 |
| 5,495,768 A | 3/1996 | Louwagie et al. ............. 73/706 |
| 5,498,079 A | 3/1996 | Price ........................ 374/208 |
| 5,502,659 A | 3/1996 | Braster et al. ............ 364/571.01 |
| 5,524,333 A | 6/1996 | Hogue et al. ................. 29/593 |
| 5,524,492 A | 6/1996 | Frick et al. ................... 73/706 |
| 5,546,804 A | 8/1996 | Johnson et al. ............... 73/431 |
| 5,600,782 A | 2/1997 | Thomson ................ 395/182.02 |
| 5,606,513 A | 2/1997 | Louwagie et al. ............. 364/510 |
| 5,650,936 A | 7/1997 | Loucks et al. ................ 364/483 |
| 5,656,782 A | 8/1997 | Powell, II et al. ............. 73/756 |
| 5,665,899 A | 9/1997 | Willcox .................... 73/1.63 |
| 5,668,322 A | 9/1997 | Broden ..................... 73/756 |
| 5,669,713 A | 9/1997 | Schwartz et al. ............... 374/1 |
| 5,670,722 A | 9/1997 | Moser et al. ................. 73/756 |
| 5,677,476 A | 10/1997 | McCarthy et al. ........... 73/29.01 |
| 5,684,451 A * | 11/1997 | Seberger et al. ........ 340/310.16 |
| 5,705,978 A | 1/1998 | Frick et al. .................. 340/511 |
| 5,710,552 A | 1/1998 | McCoy et al. ........... 340/870.21 |
| 5,754,596 A | 5/1998 | Bischoff et al. ............... 375/295 |
| 5,764,928 A | 6/1998 | Lancott .................... 395/285 |
| 5,787,120 A | 7/1998 | Louagie et al. .............. 375/257 |
| 5,823,228 A | 10/1998 | Chou ....................... 137/597 |
| 5,870,695 A | 2/1999 | Brown et al. ................ 702/138 |
| 5,899,962 A | 5/1999 | Louwagie et al. ............. 702/138 |
| 5,920,016 A | 7/1999 | Broden ...................... 73/756 |
| 5,948,988 A | 9/1999 | Bodin ....................... 73/706 |
| 5,954,526 A | 9/1999 | Smith ....................... 439/136 |
| 5,955,684 A | 9/1999 | Gravel et al. ................ 73/866.5 |
| 5,973,942 A | 10/1999 | Nelson et al. ................ 363/21 |
| 5,983,727 A | 11/1999 | Wellman et al. .............. 73/724 |
| 5,988,203 A | 11/1999 | Hutton ..................... 137/597 |
| 6,002,996 A | 12/1999 | Burks et al. ................. 702/188 |
| 6,005,500 A | 12/1999 | Gaboury et al. ............... 341/43 |
| 6,006,338 A | 12/1999 | Longsdorf et al. ............ 713/340 |
| 6,013,108 A | 1/2000 | Karolys et al. ................ 792/189 |
| 6,035,240 A | 3/2000 | Moorehead et al. ............ 700/2 |
| 6,038,927 A | 3/2000 | Karas ....................... 73/706 |
| 6,047,219 A | 4/2000 | Eidson ....................... 700/2 |
| 6,050,145 A | 4/2000 | Olson et al. .................. 73/706 |
| 6,058,441 A | 5/2000 | Shu ........................ 710/100 |
| 6,059,254 A | 5/2000 | Sundet et al. ................ 248/678 |
| 6,105,437 A | 8/2000 | Klug et al. ................... 73/756 |
| 6,111,888 A | 8/2000 | Green et al. ................. 370/461 |
| 6,115,831 A | 9/2000 | Hanf et al. ................... 714/43 |
| 6,123,585 A | 9/2000 | Hussong et al. ............... 439/652 |
| 6,131,467 A | 10/2000 | Miyano et al. ................ 73/756 |
| 6,140,952 A | 10/2000 | Gaboury ..................... 341/143 |
| 6,151,557 A | 11/2000 | Broden et al. ................ 702/47 |
| 6,175,770 B1 | 1/2001 | Bladow ...................... 700/2 |
| 6,182,019 B1 | 1/2001 | Wiklund |
| D439,177 S | 3/2001 | Fandrey et al. |
| D439,178 S | 3/2001 | Fandrey et al. |
| D439,179 S | 3/2001 | Fandrey et al. |
| D439,180 S | 3/2001 | Fandrey et al. |
| D439,181 S | 3/2001 | Fandrey et al. |
| 6,216,172 B1 | 4/2001 | Kolblin et al. ............... 709/253 |
| D441,672 S | 5/2001 | Fandrey et al. |
| 6,233,532 B1 | 5/2001 | Boudreau et al. .............. 702/89 |
| 6,285,964 B1 | 9/2001 | Babel et al. .................. 702/121 |
| 6,295,875 B1 | 10/2001 | Frick et al. .................. 73/718 |
| 6,311,568 B1 | 11/2001 | Kleven ................... 73/861.42 |
| 6,321,166 B1 | 11/2001 | Evans et al. ................. 702/50 |
| 6,415,188 B1 | 7/2002 | Fernandez et al. ............. 700/67 |
| 6,421,570 B1 | 7/2002 | McLaughlin et al. ........... 700/2 |
| 6,429,786 B1 | 8/2002 | Bansemir et al. ......... 340/870.27 |
| 6,460,094 B1 | 10/2002 | Hanson et al. ................ 710/8 |
| 6,484,107 B1 | 11/2002 | Roper et al. ................. 702/50 |
| 6,508,131 B2 | 1/2003 | Frick ....................... 73/756 |
| D471,829 S | 3/2003 | Dennis et al. ............... D10/85 |
| D472,831 S | 4/2003 | Dennis et al. ............... D10/85 |
| 6,516,672 B2 | 4/2003 | Wang ....................... 73/718 |
| 6,553,076 B1 | 4/2003 | Huang ..................... 375/257 |
| 6,593,857 B1 | 7/2003 | Roper et al. ............... 340/870.3 |
| 6,546,805 B2 | 11/2003 | Fandrey et al. ............... 73/753 |
| 6,754,601 B1 | 6/2004 | Eryurek et al. |
| 6,765,968 B1 | 7/2004 | Nelson et al. ............... 375/257 |
| 6,898,980 B2 | 5/2005 | Behm et al. .................. 73/756 |
| 6,961,665 B2 | 11/2005 | Slezak ....................... 702/61 |
| 7,109,883 B2 | 9/2006 | Trimble et al. .......... 340/870.16 |
| 2002/0011115 A1 | 1/2002 | Frick ....................... 73/718 |

| | | | | |
|---|---|---|---|---|
| 2002/0082799 | A1 | 6/2002 | Pramanik | 702/130 |
| 2004/0184517 | A1 | 9/2004 | Westfield et al. | 375/219 |
| 2005/0056106 | A1 | 3/2005 | Nelson et al. | 73/866.3 |

FOREIGN PATENT DOCUMENTS

| | | |
|---|---|---|
| DE | 91 09 176.4 | 10/1991 |
| DE | 196 22 295 | 5/1996 |
| DE | 19622295 | 11/1997 |
| DE | 197 45 244 A1 | 4/1998 |
| DE | 299 03 260 U1 | 5/2000 |
| DE | 102 21 931 A1 | 5/2002 |
| EP | 0 063 685 A1 | 11/1982 |
| EP | 0 167 941 A2 | 1/1986 |
| EP | 0 214 801 A1 | 3/1987 |
| EP | 0 223 300 A2 | 5/1987 |
| EP | 0 268 742 A1 | 6/1988 |
| EP | 0 518 916 B1 | 2/1991 |
| EP | 0 639 039 A1 | 2/1995 |
| EP | 0 895 209 | 3/1999 |
| EP | 0 895 209 A1 | 3/1999 |
| EP | 0 903 651 A1 | 3/1999 |
| EP | 1 192 614 | 1/2003 |
| JP | 401313038 | 12/1989 |
| JP | 5-120595 | 5/1993 |
| JP | 2000121470 | 10/1998 |
| JP | 2003/042881 | 2/2003 |
| RU | 2111543 C1 | 5/1998 |
| RU | 98108150 A | 2/2000 |
| WO | WO 88/01417 | 2/1988 |
| WO | WO 89/02578 | 3/1989 |
| WO | WO 89/04089 | 5/1989 |
| WO | WO 90/15975 | 12/1990 |
| WO | WO 91/13417 | 9/1991 |
| WO | WO 91/18266 | 11/1991 |
| WO | WO 96/34264 | 10/1996 |
| WO | WO 98/48489 | 10/1998 |
| WO | WO 00/23776 | 4/2000 |
| WO | WO 2004/023423 | 3/2004 |
| WO | WO 2007/002769 | 1/2007 |

OTHER PUBLICATIONS

First Office Action for Application No. 200580010070.4, date of filing the application Mar. 7, 2005; Translation provided, 2 pages.
Chinese Office for corresponding Chinese Patent Application No. 200580010070.4 dated Jan. 8, 2010, 6 pgs.
"Decision on Grant" for Application No. 2006138032/09 (041419), date of filing the application May 7, 2005; Translation provided, 12 pages.
U.S. Appl. No. 09/862,762, filed May 21, 2001, Wang.
U.S. Appl. No. 09/867,961, filed May 30, 2001, Fandrey et al.
U.S. Appl. No. 09/671,495, filed Sep. 27, 2000, Behm et al.
U.S. Appl. No. 09/519,781, filed Mar. 7, 2000, Nelson et al.
U.S. Appl. No. 09/520,292, filed Mar. 7, 2000, Davis et al.
U.S. Appl. No. 09/519,912, filed Mar. 7, 2000, Nelson et al.
U.S. Appl. No. 09/672,338, filed Sep. 28, 2000, Nelson et al.
U.S. Appl. No. 09/638,181, filed Jul. 31, 2000, Roper et al.
U.S. Appl. No. 09/571,111, filed May 15, 2000, Westfield et al.
U.S. Appl. No. 09/564,506, filed May 4, 2000, Nord et al.
U.S. Appl. No. 09/667,289, filed Sep. 22, 2000, Westfield et al.
U.S. Appl. No. 09/667,399, filed Sep. 21, 2000, Behm et al.
U.S. Appl. No. 09/671,130, filed Sep. 27, 2000, Fandrey et al.
U.S. Appl. No. 10/125,286, filed Apr. 18, 2002, Behm et al.
Product Data Sheet No: 00813-0100-4378, "Model 751 Field Signal Indicator", by Rosemount Inc., Eden Prairie, Minnesota, (1997).
Product Data Sheet No: 00813-0100-4731, "APEX™ Radar Gauge", by Rosemount Inc., Eden Prairie, Minnesota, (1998).
Product Data Sheet No: 00813-0100-4640, "Model 3201 Hydrostatic Interface Unit", from the Rosemount Comprehensive Product Catalog, published 1998, by Rosemount Inc., Eden Prairie, Minnesota.
Product Data Sheet No: 00813-0100-4003, "Model 8800A", by Rosemount Inc., Eden Prairie, Minnesota, (1998).
Product Data Sheet No: 00813-0100-4773, "Model 8742C—Magnetic Flowmeter Transmitter with Foundation™ Fieldbus", from the Rosemount Comprehensive Product Catalog, published 1998, by Rosemount Inc., Eden Prairie, Minnesota.
"Rosemount Model 8732C Magnetic Flowmeter Transmitter", by Rosemount Inc., Eden Prairie, Minnesota, (1998).
Product Data Sheet No: 00813-0100-4263, "Model 444 Alphaline® Temperature Transmitters", by Rosemount Inc., Eden Prairie, Minnesota, (1997).
Product Data Sheet No: 00813-0100-4769, "Model 3244MV Multivariable Temperature Transmitter with Foundation™ Fieldbus", by Rosemount Inc., Eden Prairie, Minnesota, (1998).
Product Data Sheet No: 00813-0100-4724, "Models 3144 and 3244MV Smart Temperature Transmitters", by Rosemount Inc., Eden Prairie, Minnesota, (1998).
Product Data Sheet No: 00813-0100-4738, "Model 3095FB Multivariable™ Transmitter with Modbus™ Protocol", by Rosemount Inc., Eden Prairie, Minnesota, (1996, 1997).
Product Data Sheet No: 00813-0100-4001, "Model 3051 Digital Pressure Transmitter for Pressure, Flow, and Level Measurement", by Rosemount Inc., Eden Prairie, Minnesota, (1998).
Product Data Sheet No: 00813-0100-4698, "Model 2090F Sanitary Pressure Transmitter", by Rosemount Inc., Eden Prairie, Minnesota, (1998).
Product Data Sheet No: 00813-0100-4690, "Model 2088 Economical Smart Pressure Transmitter", by Rosemount Inc., Eden Prairie, Minnesota, (1998).
Product Data Sheet No: 00813-0100-4592, "Model 2024 Differential Pressure Transmitter", by Rosemount Inc., Eden Prairie, Minnesota, (1987-1995).
Product Data Sheet No: 00813-0100-4360, "Model 1151 Alphaline® Pressure Transmitters", by Rosemount Inc., Eden Prairie, Minnesota, (1998).
Product Data Sheet No: 00813-0100-4458, "Model 1135F Pressure-to-Current Converter", by Rosemount Inc., Eden Prairie, Minnesota, (1983, 1986, 1994).
"Single Chip Senses Pressure and Temperature," *Machine Design*, 64 (1992) May 21, No. 10.
Brochure: "Reduce Unaccounted-For Natural Gas with High-Accuracy Pressure Transmitters," Rosemount Inc. Measurement Division, Eden Prairie, Minnesota, ADS 3073, May 1991, pp. 1-4.
Technical Information Bulletin, "Liquid Level Transmitter Model DB40RL Sanitary Sensor *deltapilot*," Endress + Hauser, Greenwood, Indiana, Sep. 1992, pp. 1-8.
"The Digitisation of Field Instruments" W. Van Der Bijl, *Journal A*, vol. 32, No. 3, 1991, pp. 62-65.
Specification Summary, "Teletrans™ 3508-30A Smart Differential Pressure Transmitter," (undated) Bristol Babcock, Inc., Watertown, CT, 06795.
Specification Summary, "Teletrans™ 3508-10A Smart Pressure Transmitter," (undated) Bristol Babcock, Inc., Watertown, CT, 06795.
Specification Summary, "AccuRate Advanced Gas Flow Computer, Model GFC 3308," (undated) Bristol Babcock, Inc., Watertown, CT, 06795.
Product Data Sheet PDS 4640, "Model 3201 Hydrostatic Interface Unit," Mar. 1992, Rosemount Inc., Eden Prairie, MN 55344.
Product Data Sheet PDS 4638, "Model 3001CL Flush-Mount Hydrostatic Pressure Transmitter," Jul. 1992, Rosemount Inc., Eden Prairie, MN 55344.
"Flow Measurement," *Handbook of Fluid Dynamics*, V. Streeter, Editor-in-chief, published by McGraw-Hill Book Company, Inc. 1961, pp. 14-4 to 14-15.
"Precise Computerized In-Line Compressible Flow Metering," *Flow—Its Measurement and Control in Science and Industry*, vol. 1, Part 2, Edited by R. Wendt, Jr., Published by American Institute of Physics et al, (undated) pp. 539-540.
"A Systems Approach," Dr. C. Ikoku, *Natural Gas Engineering*, PennWell Books, (undated) pp. 256-257.
"Methods for volume Measurement Using Tank-Gauging Devices Can Be Error Prone," F. Berto, *The Advantages of Hydrostatic Tank Gauging Systems*, undated reprint from *Oil & Gas Journal*.

"Hydrostatic Tank Gauging—Technology Whose Time Has Come," J. Berto, *Rosemount Measurement Division Product Feature*, undated reprint from *INTECH*.

"Pressure Sensors Gauge Tank Level and Fluid Density," *Rosemount Measurement Division Product Feature*, undated reprint from *Prepared Foods* (Copyrighted 1991 by Gorman Publishing Company).

"Low Cost Electronic Flow Measurement System," *Tech Profile*, May 1993, Gas Research Institute, Chicago, IL.

"Development of an Integrated EFM Device for Orifice Meter Custody Transfer Applications," S.D. Nieberle et al., *American Gas Association Distribution/Transmission Conference & Exhibit*, May 19, 1993.

Advertisement, AccuRate Model 3308 Integral Smart DP/P/T Transmitter, (undated) Bristol Babcock, Inc., Watertown, CT 06795.

Advertisement, Model 3508 DP Transmitter, *Control Engineering*, Dec. 1992, Bristol Babcock, Inc., Watertown, CT 06795.

"Smart Transmitters Tear Up the Market," C. Polsonetti, *INTECH*, Jul. 1993, pp. 42-45.

"MicroLAN Design Guide", Dallas Semiconductor, Tech Brief No. 1, (undated).

"Bosch CAN Specification Version 2.0", by Robert Bosch GmbH, pp. 1-68 including pp. -1- and -2-, (Sep. 1991).

Product Data Sheet No. 00813-0100-4001, "Digital Pressure Transmitter for Pressure, Flow, and Level Measurement", by Rosemount Inc., (1998).

"Claudius Ptolemy (100?-170? AD)", *M&C News*, 7 pages, (Apr. 1994).

American National Standard, "Hydraulic Fluid Power-Solenoid Piloted Industrial Valves-Interface Dimensions for Electrical Connectors", National Fluid Power Association, Inc., 10 pages, (Aug. 1981).

2 pages downloaded from http://www.interlinkbt.com/PRODUCT/IBT_PROD/DN/CN-DM_PN/EURO-DP.HTM dated Sep. 15, 2000.

4 pages downloaded from http://www.interlinkbt.com/PRODUCT/IBT_PROD/dn/EUR-CON/euro-fwc.htm dated Sep. 15, 2000.

3 pages from Turk Cable Standards, by Turk, Inc., Minneapolis, Minnesota.

"Notification of Transmittal of the International Search Report or Declaration" for International application Serial No. PCT/US00/26561.

"Notification of Transmittal of the International Search Report or Declaration" for International application Serial No. PCT/US00/26488.

"Notification of Transmittal of the International Search Report or Declaration" for International application Serial No. PCT/US00/26563.

"Notification of Transmittal of the International Search Report or Declaration" for International application Serial No. PCT/US01/13993.

"Notification of Transmittal of the International Search Report or Declaration" for International application Serial No. PCT/US01/14521.

European Office Action from corresponding European Patent Application No. 05724798.3-2213.

2002 Microchip Technology Inc., "Stand-Alone CAN Controller with SPI™ Interface," pp. 1-75, Mar. 1, 2002.

Rosemount Reference Manual 00809-0100-4022,Rev AA, Jul. 2002, "Model 4600 Oil & Gas Panel Transmitter," 65 pages.

Transmitter Schematic, Sold Jul. 2002.

Notification of Transmittal of the International Search Report and the Written Opinion of the International Searching Authority for International Application No. PCT/US2005/007328 filed Mar. 7, 2005. Date of Mailing: Jan. 12, 2006.

Chinese Office for corresponding Chinese Patent Application No. 200580010070.4, dated Sep. 25, 2009, 5 pgs.

Office Action from European Patent Application No. 06845045.5. dated Sep. 25, 2008, 3 pgs.

Invitation to Pay Additional Fees for International Application No. PCT/US2005/007328, filed Mar. 7, 2005; date of mailing: Nov. 8, 2005.

International Preliminary Report and Written Opinion for International Application No. PCT/US2005/007328 filed Mar. 7, 2005. Date of Mailing: Oct. 12, 2006.

* cited by examiner

TWO WIRE TRANSMITTER WITH ISOLATED CAN OUTPUT

CROSS-REFERENCE TO RELATED APPLICATION

The present application is a continuation-in-part of and claims priority from U.S. patent application Ser. No. 10/236,874, filed Sep. 6, 2002 for inventors Steven R. Trimble, Kelly M. Orth, Richard M. Nelson and David G. Tyson and titled "LOW POWER PHYSICAL LAYER FOR A BUS IN AN INDUSTRIAL TRANSMITTER," the content of which is hereby incorporated herein by reference in its entirety.

BACKGROUND OF THE INVENTION

Process variable transmitters are used to sense process variables and provide electrical outputs that represent the magnitudes of the process variables. As electronic and sensor components in process variable transmitters are increasingly miniaturized, and more functions are added to the transmitters, the circuitry inside the transmitter becomes packed very densely, leading to new power management, noise and interference problems internal to the transmitter.

There is a problem with noise affecting low level sensor circuitry in two-wire HART transmitters that also include a controller area network (CAN) transceiver line. There is a need to provide better protection from noise in sensor circuitry in miniature two-wire process variable transmitters that include a CAN transceiver line.

There is also a problem with meeting the energization needs of the CAN circuitry and other transmitter circuitry from the loop energization which is mismatched to the energization needs.

Transmitters are needed that overcomes these problems. Embodiments of the present invention provide solutions to these and other problems, and offer other advantages over the prior art.

SUMMARY OF THE INVENTION

Disclosed is a process variable transmitter comprising a transmitter output circuit that provides bidirectional HART and controller area network communication transceiver lines. The transmitter output circuit also comprises sensor circuit interface contacts.

An isolated circuit couples to the sensor circuit interface contacts. The isolated circuit comprises sensor circuitry sensing a process variable. The isolated circuit further comprises a galvanic isolation barrier galvanically isolating the sensor circuitry from the HART and controller area network transceiver lines.

Other features and benefits that characterize embodiments of the present invention will be apparent upon reading the following detailed description and review of the associated drawings.

DETAILED DESCRIPTION OF THE ILLUSTRATED EMBODIMENTS

In the embodiments described below, problems with power management, noise and interference in high density circuitry in a process variable transmitter with a CAN transceiver line are alleviated. Low level sensing circuitry is referenced to process ground and a galvanic isolation barrier is provided between the sensing circuitry and HART and controller area network (CAN) transceiver lines. The HART and CAN transceiver lines are not able to effectively couple noise into low level sensing circuits, and the transmitter can take advantage of miniaturized components to make a compact transmitter.

A stacked power supply allows current through CAN circuitry and other transmitter loads to exceed a minimum loop current through re-use of current.

Figure 1:
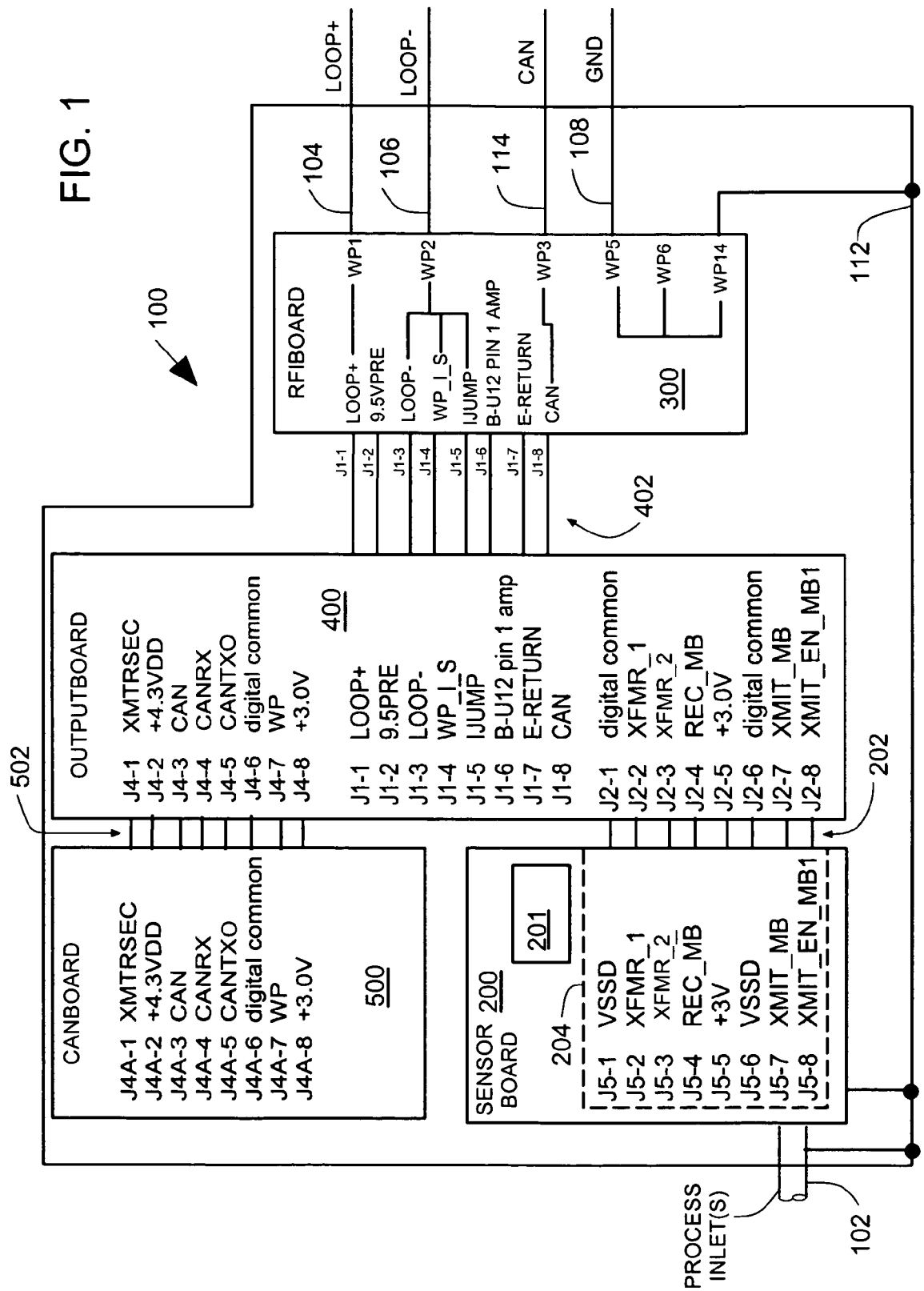
FIG. 1 illustrates electrical connections between circuit boards in a two-wire process variable transmitter that includes HART and CAN transceiver lines.

FIG. 1 illustrates an internal connection diagram of an exemplary embodiment of an industrial process variable transmitter 100. The process variable transmitter 100 includes printed circuit boards such as a sensor board 200, an RFI board 300, an output board 400, and a CAN board 500 that are electrically connected to provide transmitter functions. The transmitter 100 couples to a fluid process inlet fitting 102 and senses a process variable such as pressure, temperature, flow or the like, of a process fluid in the process inlet fitting 102.

The transmitter 100 includes loop leads 104, 106 for coupling to an industrial process control loop (illustrated in FIG. 3) that is external to the transmitter 100. The transmitter 100 may include grounding lead 108 for connecting the transmitter 100 to a process ground (illustrated in FIG. 3). The transmitter includes a housing 112 that is connected to process ground by way of the grounding lead 108. The housing 112 may also be connected to process ground through the process inlet 102. The transmitter 100 includes a CAN transceiver lead 114 for connection to one or more CAN devices (illustrated in FIG. 3) that are external to the transmitter 100.

The loop leads 104, 106 are bidirectional HART communication transceiver lines for communication with an external device that is compatible with HART communications. The CAN lead 114 is a controller area network transceiver line for communication with an external device that is compatible with CAN communications.

In a preferred embodiment, the leads 104, 106, 108, 114 are flying leads, however, other electrical connection devices such as screw terminals, compression terminals, multipin connectors and the like can be used as well.

The transmitter 100 is a two-wire transmitter in the sense that it is an electronic transmitter that uses two power wires 104, 106 for signal transmission. The two-wire transmitter 100 also includes a ground lead 108 and a CAN transceiver lead 114.

The CAN board 500 includes contacts J4A-1 through J4A-8 that are connected by a connector 502 to correspondingly numbered contacts J4-1 through J4-8 on the output board 400. The sensor board 200 includes contacts J5-1 through J5-8 that are connected by connector 202 to correspondingly numbered contacts J2-1 through J2-8 on the output board 400. The sensor board contacts J5-1 through J5-8 comprise sensor circuit interface contacts. The sensor board 200 preferably includes a galvanic barrier 204 that isolates sensor board circuitry that is connected to connector 202 from an isolated circuit 201 on the sensor board 200 that is connected to process ground. The sensor board 200 comprises an isolated circuit coupled to the sensor circuit interface contacts.

The output board 400 includes contacts J1-1 through J1-8 that are connected by a connector 402 to correspondingly numbered contacts J1-1 through J1-8 on the RFI board 300. The connectors 202, 402, 502 can comprise flexible ribbon cables, in line pins or other know connectors for making connections between printed circuit boards.

Examples of circuitry on circuit boards 200, 300, 400, 500 are described below in connection with FIGS. 2-7, 9-12. It will be understood by those skilled in the art that the arrangement shown in FIG. 1 is merely exemplary, and that the number and type of circuit boards in a transmitter can vary from that shown depending on the particular process variable that is sensed and the needs of a particular application.

Figure 2:
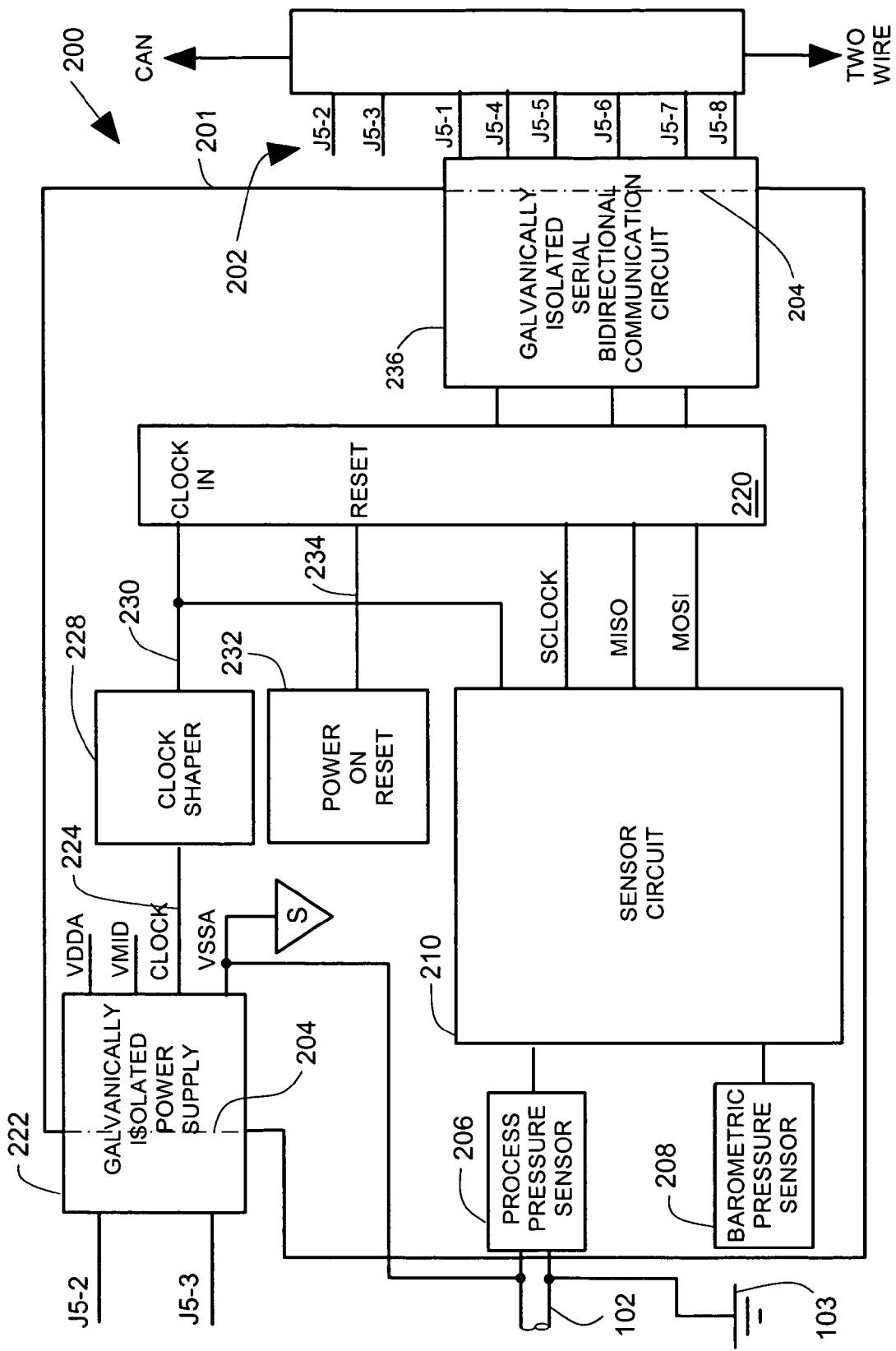
FIG. 2 illustrates a block diagram of a sensor board in a process variable transmitter.

FIG. 2 illustrates a block diagram of an exemplary embodiment of a sensor board 200. An isolated circuit 201 on the sensor board 200 is galvanically isolated from the contacts J5-1 through J5-8. A process pressure sensor 206 couples to a process inlet 102 for sensing process pressure. The process inlet 102 typically includes a threaded metal fitting that connects to process ground 103. There is a need for a fluid connection between the process inlet 102 and the process pressure sensor 206. There would be a potential for noise coupling between process ground and the sensor circuitry if the sensor circuitry were to have ohmic connections to a CAN transceiver line instead of the galvanic isolation provided. A second pressure sensor 208 preferably comprises an absolute pressure sensor, and senses barometric pressure or a second process pressure. While the sensors 206, 208 are illustrated as included in the sensor board 200, it will be appreciated by those skilled in the art that the location and number of the sensors can vary depending on the type of process variable that is sensed, and that sensors can be located on a circuit board as illustrated, or can alternatively be mounted to a transmitter housing 112 (FIG. 1).

Sensors 206, 208 couple to a sensor circuit 210 that energizes the sensors 206, 208 and provides data on lines 214, 216 and communicates sensor outputs to a microcontroller 220 over an SPI serial communication bus that includes lines SCLOCK, MISO and MOSI as illustrated in FIG. 2. The sensor circuit 210 preferably comprises a multichannel sigma-delta analog-to-digital converter circuit. The microcontroller 220 preferably comprises a National Semiconductor COP8SGE728M8 microcontroller that is programmed to provide communication protocol conversion from an SPI protocol to an SCI protocol.

Figure 7:
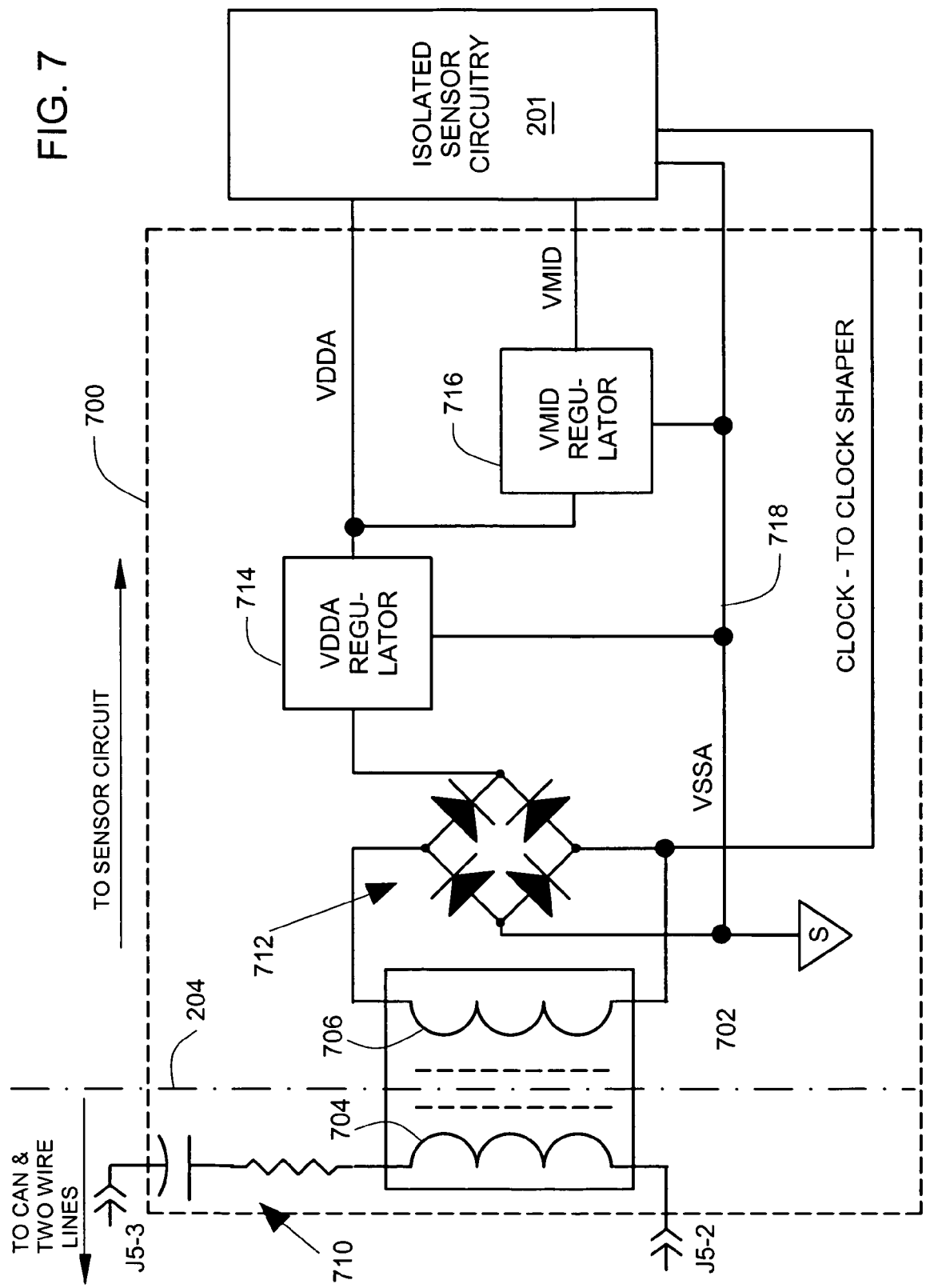
FIG. 7 illustrates a galvanically isolated power supply.

A galvanically isolated power supply 222 energizes isolated circuitry 201 on the sensor board 200 with supply rails VDDA, VMID and VSSA and also provides a clock signal 224. The galvanically isolated power supply 222 includes an isolation transformer (such as illustrated in FIG. 7) that is part of a galvanic isolation barrier 204 that galvanically isolates the contacts J5-1 and J5-8, which are indirectly connected to HART and CAN transceiver lines, from the low level isolated circuitry 201 on the sensor board 200. The low level circuitry 201 on the sensor board 200 is connected to the housing 112, which is usually connected to process ground 103.

The contacts J5-2,3 on the power supply 222 are connected to circuitry (on the output board 400) that is referenced to the loop contacts 104, 106. The galvanic isolation provided by insulation in the isolation transformer forms an electrically insulating barrier between contacts J5-2,3 and the process ground 103.

The clock signal 224 couples to a clock shaper 228. The clock shaper 228 provides a shaped clock output 230 suitable for use as a clock input of the microcontroller (protocol converter) 220 and sensor circuit 210. A power on reset circuit 232 provides a power on reset signal 234 to a reset input of the microcontroller 220.

The supply rail VSSA is preferably coupled to the housing 112 such that the transmitter housing 100 and the process inlet 102 are not able to capacitively couple noise from the environment surrounding the transmitter 100 into low level circuitry on the sensor board 200. With this arrangement, the low level circuitry on the sensor board 200 is effectively surrounded by an electrostatic shield which is the metal housing 112.

Figure 6:
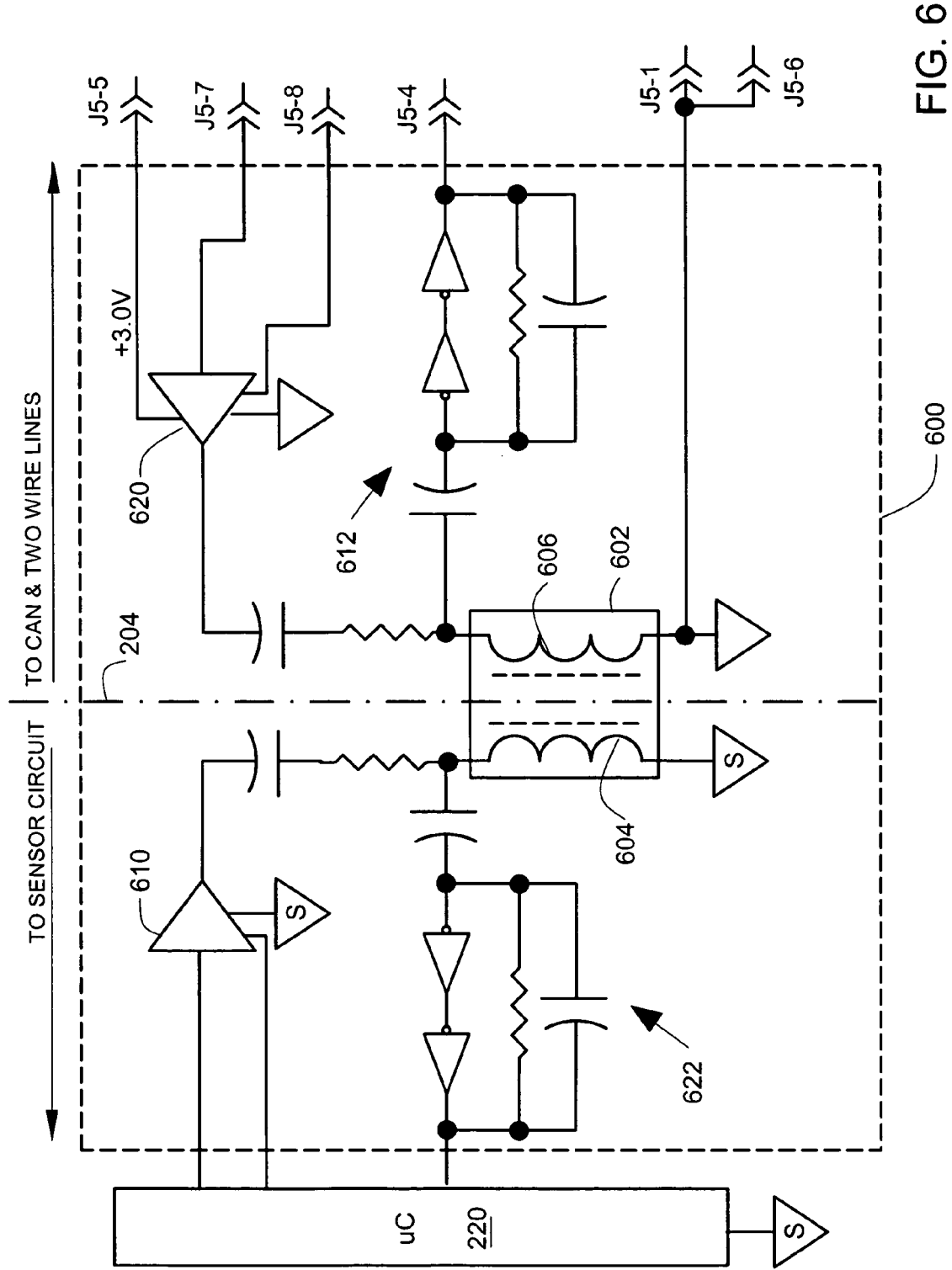
FIG. 6 illustrates a galvanically isolated serial bidirectional communication circuit.

The microcontroller (protocol converter) 220 couples input and output data for the sensor board 200 through a galvanically isolated serial bi-directional communication circuit 236. The circuit 236 includes an isolation transformer (such as illustrated in FIG. 6) that is part of the galvanic barrier 204. The galvanic barrier 204 isolates circuitry on sensor board 200 from the contacts J5-1 through J5-8. With galvanic isolation, there are no electrical conduction paths in the transmitter 100 between the contacts J5-1 through J5-8 and the low level circuitry on the sensor board 200. The galvanic isolation barrier permits the low level circuitry on sensor board 200 to be connected to the grounded metal housing 112 for noise immunity while the high level circuits in transmitter 100 are referenced to the loop terminals 104, 106 to avoid stray ground currents. The galvanic isolation barrier 204 prevents stray ground currents between the current loop and process ground. Galvanic isolation can also be accomplished by the use of optical isolators in place of an isolation transformer. Information and power pass through the galvanic barrier, however, electric currents are blocked and do not pass through the galvanic barrier.

Figure 3:
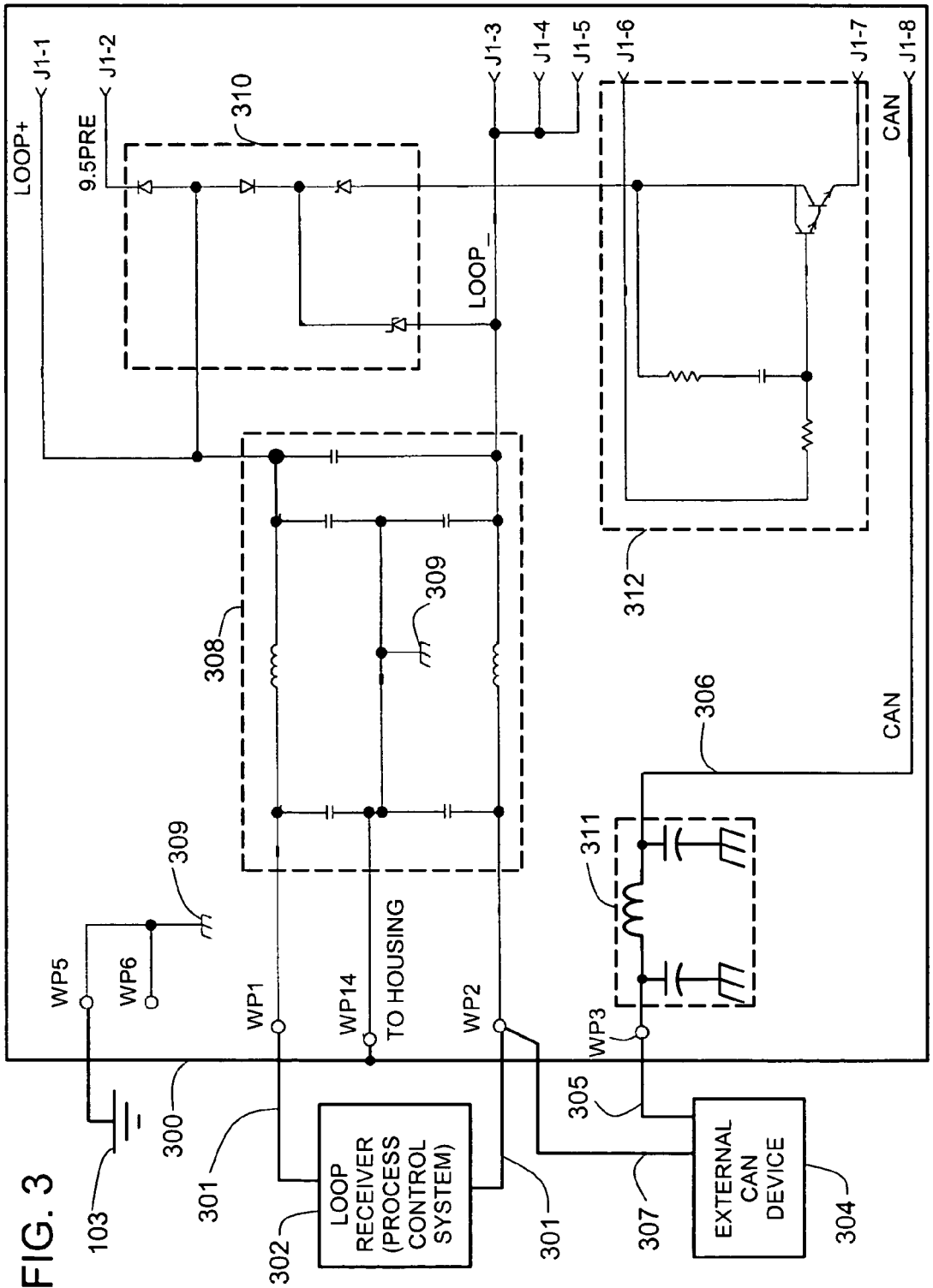
FIG. 3 illustrates a schematic of an RFI board in a process variable transmitter.

FIG. 3 illustrates an exemplary embodiment of the RFI board 300. The RFI board 300 couples via a two wire process control loop 301 to a loop receiver 302 that is external to the transmitter 100. The loop receiver 302 is typically an input channel of a process control system that provides a current that energizes the transmitter 100. The loop receiver 302 preferably senses a magnitude of a 4-20 mA loop current controlled by the transmitter 100. The loop current is representative of a corrected, sensed process variable that is sensed by sensor 206 (FIG. 2). The loop receiver 302 also preferably exchanges bi-directional HART digital communications signals with the transmitter 100. These HART digital communication signals are superimposed on the 4-20 mA current and are in a frequency range that does not interfere with sensing the 4-20 mA current magnitude.

The RFI board 300 also couples to an external CAN device 304. The external CAN device is referenced to loop minus via line 307 as illustrated. A pi filter 311 filters out RFI on CAN line 306. The external CAN device 304 is external to the transmitter 100 and communicates with the transmitter 100 using a controller area network (CAN) serial communication protocol. The external CAN device 304 can be any type of industrial device that can utilize communication with the transmitter 100. The external CAN device 304 may, for example, comprise a temperature sensor to provide temperature correction data to the transmitter 100. The external CAN device 304 may also comprise a local controller that receives process variable data from the transmitter 100. The external CAN device 304 may also comprise another transmitter of a design similar to the design of transmitter 100. The transmitter 100 thus has a first bi-directional serial communication capability for longer distance communication using the HART protocol on the process control loop 301, and also has a second bi-directional communication capability for shorter distance communication using the CAN protocol on a local two wire connection on lines 305, 307.

The RFI board 300 couples communications with the CAN external device 304 along line 306 to contact J1-8 on the output board 400 (FIG. 1). Communication signals from the CAN external device 402 pass through line 306 and also a conductor on the output board 400 to connector J4A-3 on the CAN board 500 (FIG. 1).

Current from the process loop 301 is carried by the RFI board 300 to the output board 400 (FIG. 1) by way of the contacts J1-2 and J1-3 on the RFI board 300. The RFI board 300 includes a radio frequency interference (RFI) filter 308 that filters out RFI and that couples the loop current from the loop receiver 302 to the contacts J1-1, 3. RFI filter 308 is designed to allow passage of higher frequency superimposed HART digital communications, which are in an audio frequency range. Power supply circuits portions 310, 312 of a power supply circuit are located on the RFI board 300 in order to provide a direct thermal connection between portions 310, 312 and the housing 112 for good heat sinking. A ground connection 309 in the RFI filter is connected to process ground 103 by way of wiring post WP5. The ground connection 309 is also connected to the housing 112 by way of wiring post WP14.

Figure 4:
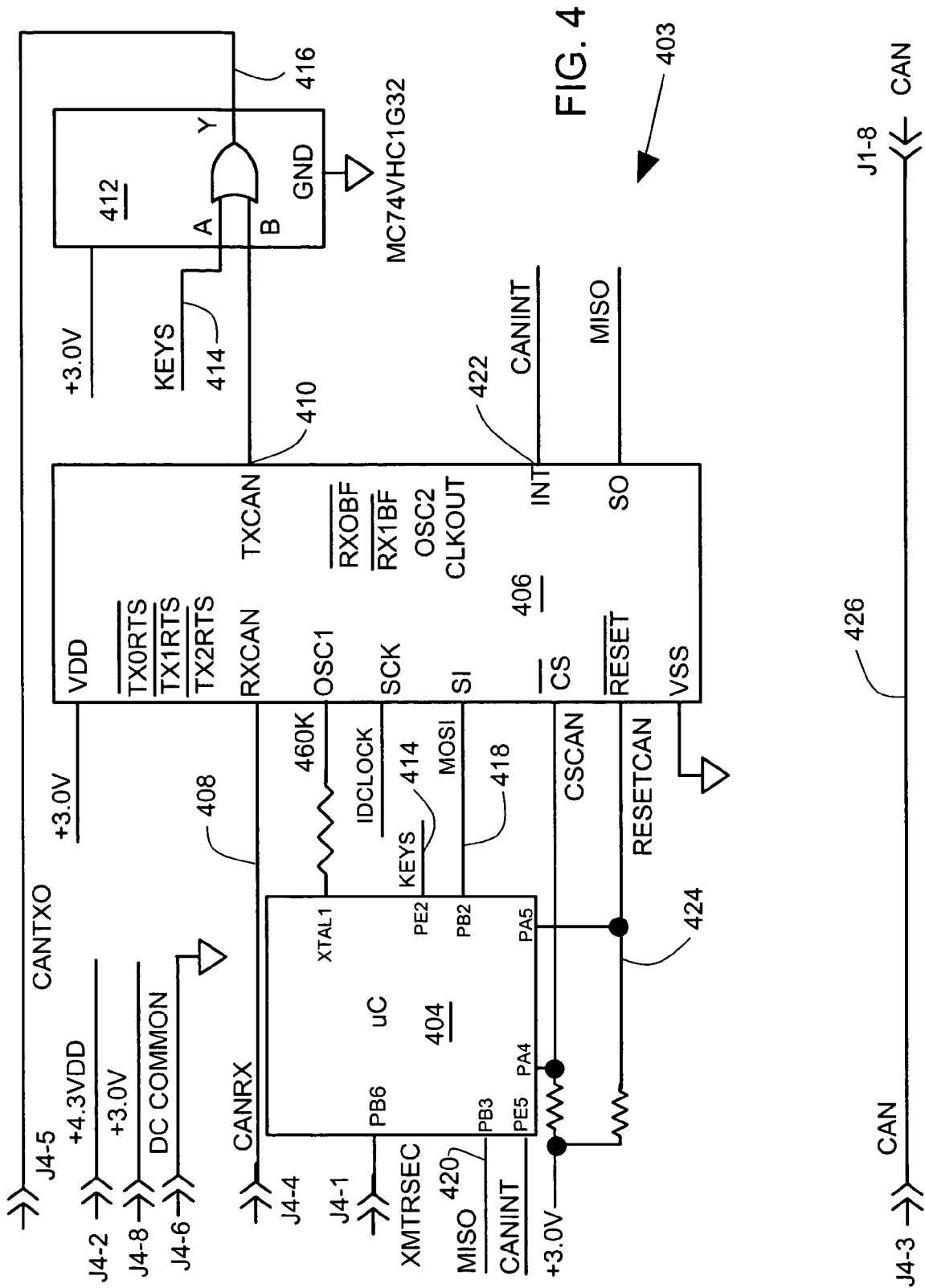
FIG. 4 illustrates a schematic of controller area network (CAN) circuitry on an output board in a process variable transmitter.

FIG. 4 illustrates an exemplary embodiment of a CAN support circuit 403 on the output board 400. The CAN support circuit 403 operates in cooperation with circuitry on the CAN board 500 (described below in connection with FIGS. 5A, 5B) to provide bi-directional communication supporting a CAN communication protocol for communication with the external CAN device 304 (FIG. 3).

The CAN support circuit 403 includes a microcontroller 404. In a preferred embodiment, the microcontroller 404 comprises an 8 bit microcontroller type ATMEGA103L. The microcontroller 404, in addition to controlling the CAN support circuitry 403, also preferably provides control to the sensor board 200 and portions of the output board 400 that support the 4-20 mA current output and HART serial communications outputs.

The CAN support circuit 403 also comprises a CAN controller 406. In a preferred arrangement, the CAN controller 406 comprises a type MCP2510 controller from Microchip Technology Inc. of Chandler, Ariz. The CAN controller 406 receives CAN-formatted communications on a CANRX line 408 and transmits CAN-formatted communications at a TXCAN output 410. In a gating circuit 412, the TXCAN output 410 is combined with a KEYS gating output 414 from the microcontroller 404. When active, the KEYS output indicates that the microcontroller 404 is in a process of receiving keyed-in configuration information via a local operator interface (LOI). The gating circuit 412 prevents transmission of CAN formatted communication to the CANTXO line 416 while a configuration process using keys on the LOI is underway. An exemplary LOI is described in connection with FIG. 4 of U.S. Pat. No. 6,484,107 B1 Roper et al. U.S. Pat. No. 6,484,107 B1 Roper et al. is hereby incorporated herein in its entirety. The LOI is external to the transmitter and can connect to an optional lead 813 (FIG. 8) for communication with a microcontroller (such as microcontroller 852 in FIG. 9B).

The CAN controller 406 communicates data (that does not have CAN formatting) with the microcontroller 404 by way of an SPI serial communication bus that includes MOSI line 418 and MISO line 420. The microcontroller 404 also applies a chip select signal CSCAN to the CAN controller 406 to control communication with the CAN controller 406. The CAN controller 406 communicates an interrupt signal CANINT 422 to the microcontroller 404 when CAN communications are being processed.

The microcontroller 404 couples a reset signal CANRESET to the CAN controller 406 at the time that power is applied to the transmitter 100 from the two wire loop.

Figure 5A:
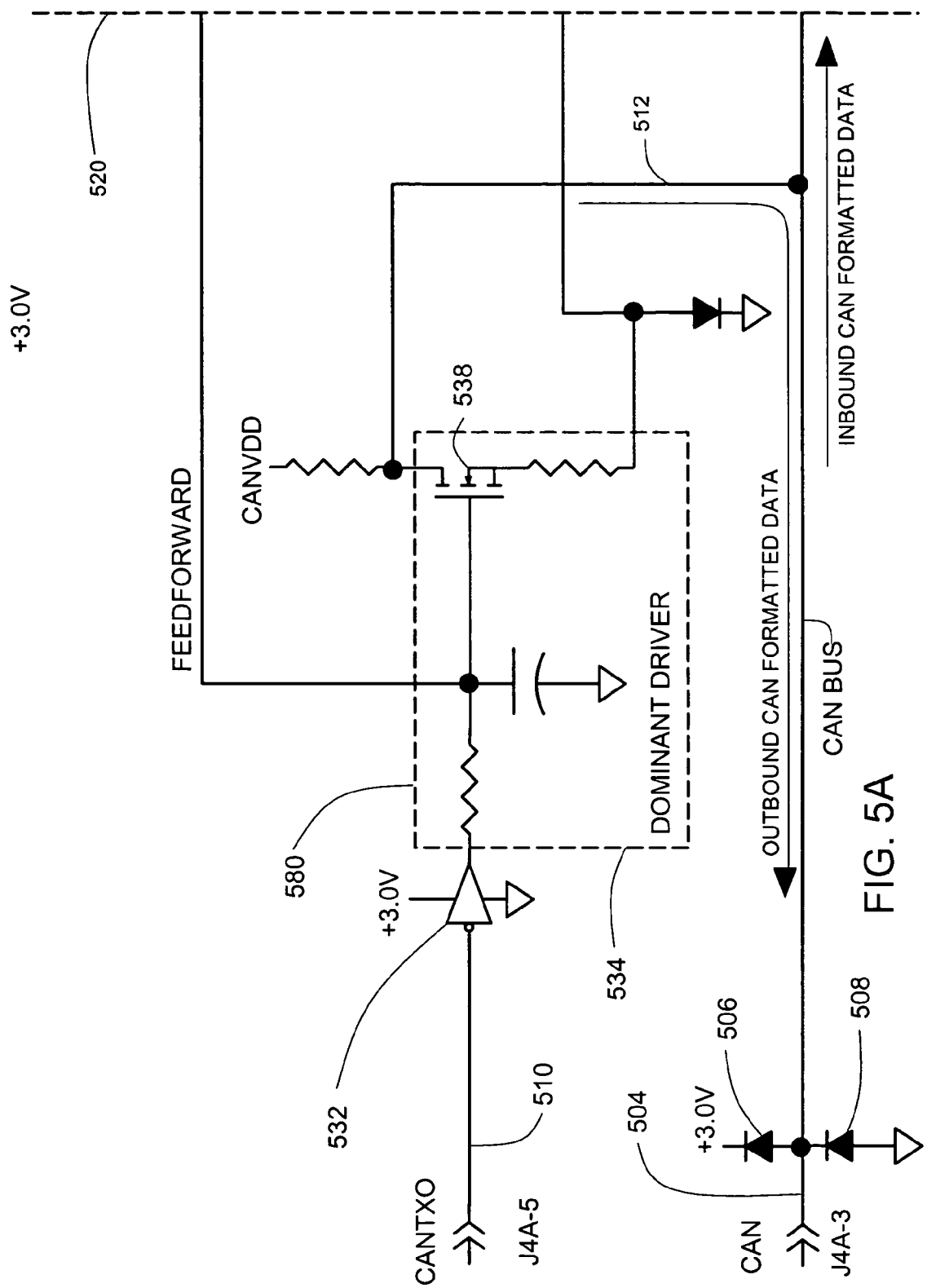
FIGS. 5A, 5B illustrate CAN dominant-recessive driver circuitry on a CAN board in a process variable transmitter.
Figure 5B:
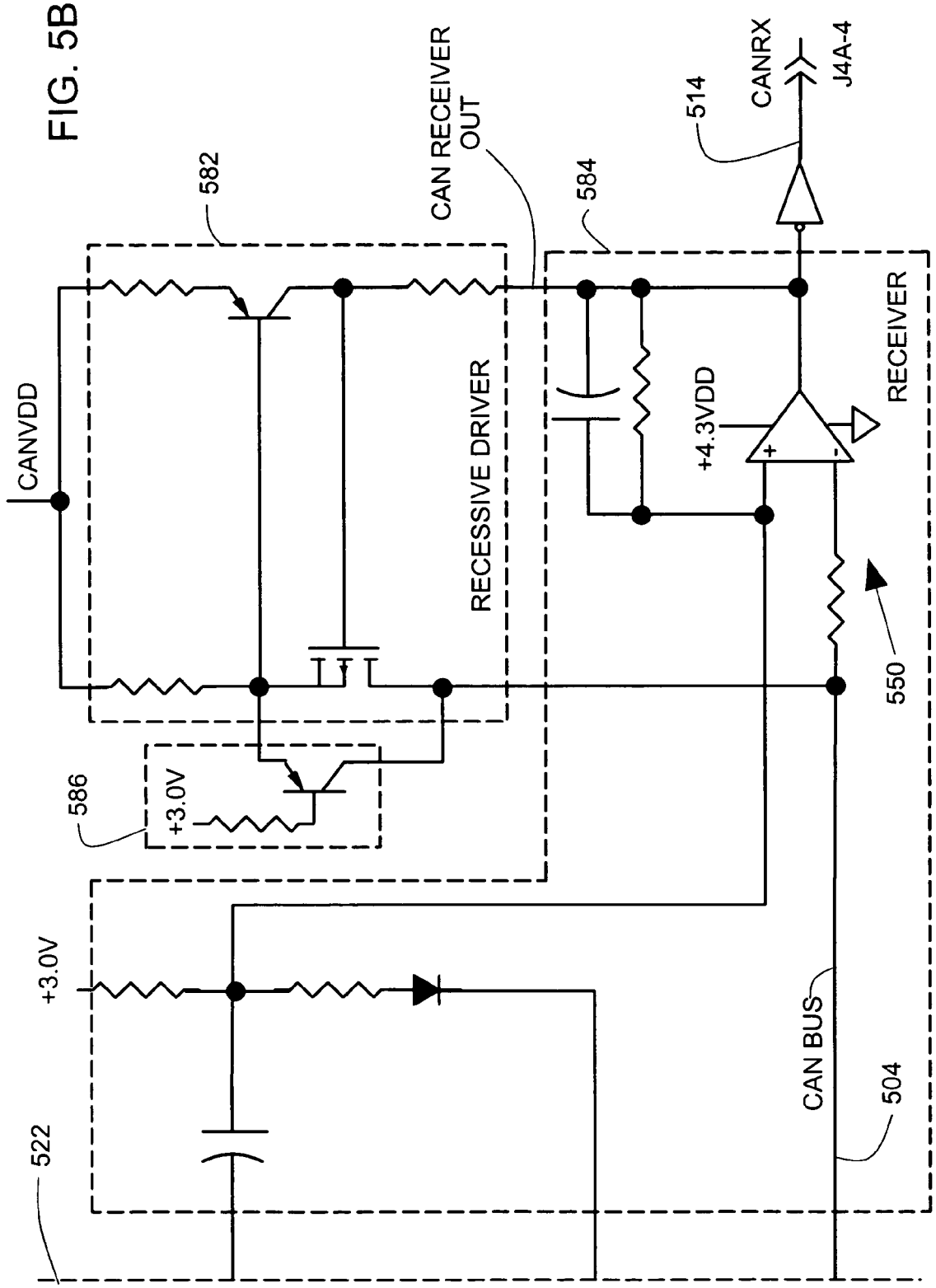

FIGS. 5A, 5B illustrate an exemplary embodiment of circuitry on the CAN board 500. The circuitry in FIGS. 5A, 5B is best understood when FIGS. 5A, 5B are joined together along dashed lines 520, 522 to form a single schematic of FIGS. 5A, 5B. In a preferred arrangement, the circuitry shown in FIGS. 5A, 5B comprises a dominant-recessive CAN driver arrangement of the type described in the above-cited U.S. patent application Ser. No. 10/236,874 entitled LOW POWER PHYSICAL LAYER FOR A BUS IN AN INDUSTRIAL TRANSMITTER filed on Sep. 6, 2002.

In FIG. 5A, a dominant driver circuit 580 is illustrated. IN FIG. 5B, a recessive driver 582, a receiver 584 and a start-up circuit 586 are illustrated.

Referring back to FIG. 3, bi-directional CAN signals are communicated with CAN external device 304 along line 306 to contact J1-8 on the RFI board 300. Contact J1-8 on the RFI board 300 connects to contact J1-8 on the output board 400 as illustrated in FIG. 1. Contact J1-8 on the output board 400 connects via conductor 426 (FIG. 4) to contact J4-3 on the output board 400. Contact J4-3 on the output board connects to contact J4A-3 on the CAN board 500 as illustrated in FIG. 5A. The CAN external device 304 is thus connected through a series of conductors and contacts to the conductor 504 as illustrated in FIG. 5A.

In FIG. 5A, protection or clamp diodes 506, 508 are connected to conductor 504 to limit the voltage on conductor 504 to a range of approximately +3.7 volts to −0.7 volts. This clamping arrangement limits noise and does not interfere with the normal levels of CAN communication signals.

When the gating circuit 412 (FIG. 4) generates outbound CAN communications on the CANTXO line, these outbound CAN communications are conducted through connector J4-5 (FIG. 4) and connector J4A-5 (FIG. 5A) to line 510 (CANTXO) in FIG. 5A. The circuitry in FIG. 5A amplifies the relatively low power CAN communications CANTXO signal on line 510 to provide a higher power level that is coupled along line 512 to line 504 and on to the CAN external device 304. When the CAN external device 304 generates CAN communications that are inbound to the transmitter 100, then the amplifier 550 in FIG. 5B receives the inbound CAN communications on line 504 and amplifies the signals to provide the CANRX signal on line 514. The CANRX signal is conducted by connector J4A-4 (FIG. 5B) to connector J4-4 (FIG. 4) to line 408 (FIG. 4) and provides the CANRX signal the CAN controller 406.

In FIG. 5A, the CANTXO signal is applied to an input of an inverter 532. The arrangement of the inverter 532 ensures that leading and trailing edges are sharply defined, and that the signal at an output of the inverter 532 has a low impedance. The output of the inverter 532 is coupled to the dominant driver circuit 580 that includes a MOSFET 538.

FIG. 6 illustrates an example of a galvanically isolated serial bidirectional communication circuit adapted for use in the circuit of FIG. 2. Circuit 600 includes a transformer 602 that includes a first winding 604 that is galvanically isolated from a second winding 606 by transformer insulation materials. The insulation material forms part of the galvanic barrier 204 that galvanically isolates low level isolated circuitry 201 (FIG. 2) from high level loop-referenced circuitry that drives the HART and CAN transceiver lines (FIG. 1). Signal coupling across the galvanic barrier 204 is magnetic rather than electrical in order to provide electrical isolation.

A microcontroller 220 (FIGS. 2,6) is coupled to an amplifier 610 that drives winding 604 with a serial communication signal to transfer out data and commands from the sensor board. A corresponding serial communication signal is magnetically induced in the winding 606 and couples the data and commands from the sensor board via shaping network 612 to the output board. The output board is coupled to an amplifier 620 that drives winding 606 with a serial communication signal to transfer out data and commands from the output board. A corresponding serial communication signal is magnetically induced in the winding 604 and couples the data and commands from the output board via shaping network 622 to the sensor board. Communication is thus bidirectional through circuit 600.

FIG. 7 illustrates an example of a galvanically isolated power supply circuit 700 adapted for use in the circuit of FIG. 2. Circuit 700 includes a transformer 702 that includes a first or primary winding 704 that is galvanically isolated from a secondary winding 706 by transformer insulation materials. The insulation material forms part of the galvanic barrier 204 that galvanically isolates low level isolated circuitry 201 (FIG. 2) from high level loop-referenced circuitry that drives the HART and CAN transceiver lines (FIG. 1). Power coupling across the galvanic barrier 204 is magnetic rather than electrical in order to provide electrical isolation.

Transformer 702 received an energization current at contacts J5-3 and J5-2. An RC network 710 is in series with the primary winding 704 to better match the transformer to its drive at contacts J5-3 and J5-2. The secondary winding 706 is connected to a bridge rectifier 712. The bridge rectifier 712 rectifies the output of the secondary winding 706 and applies the rectified output to a first regulator circuit 714 that generates a first low level power supply voltage VDDA. VDDA is preferably less than 5.5 volts to provide low power consumption. VDDA is connected to a second regulator 716 that generates a second low level power supply voltage VMID. VMID is preferably less than 2.3 volts. A common conductor on the sensor board 718 is connected to the bridge rectifier 712, the regulators 714, 716 and the isolated circuitry 201.

Figure 8:
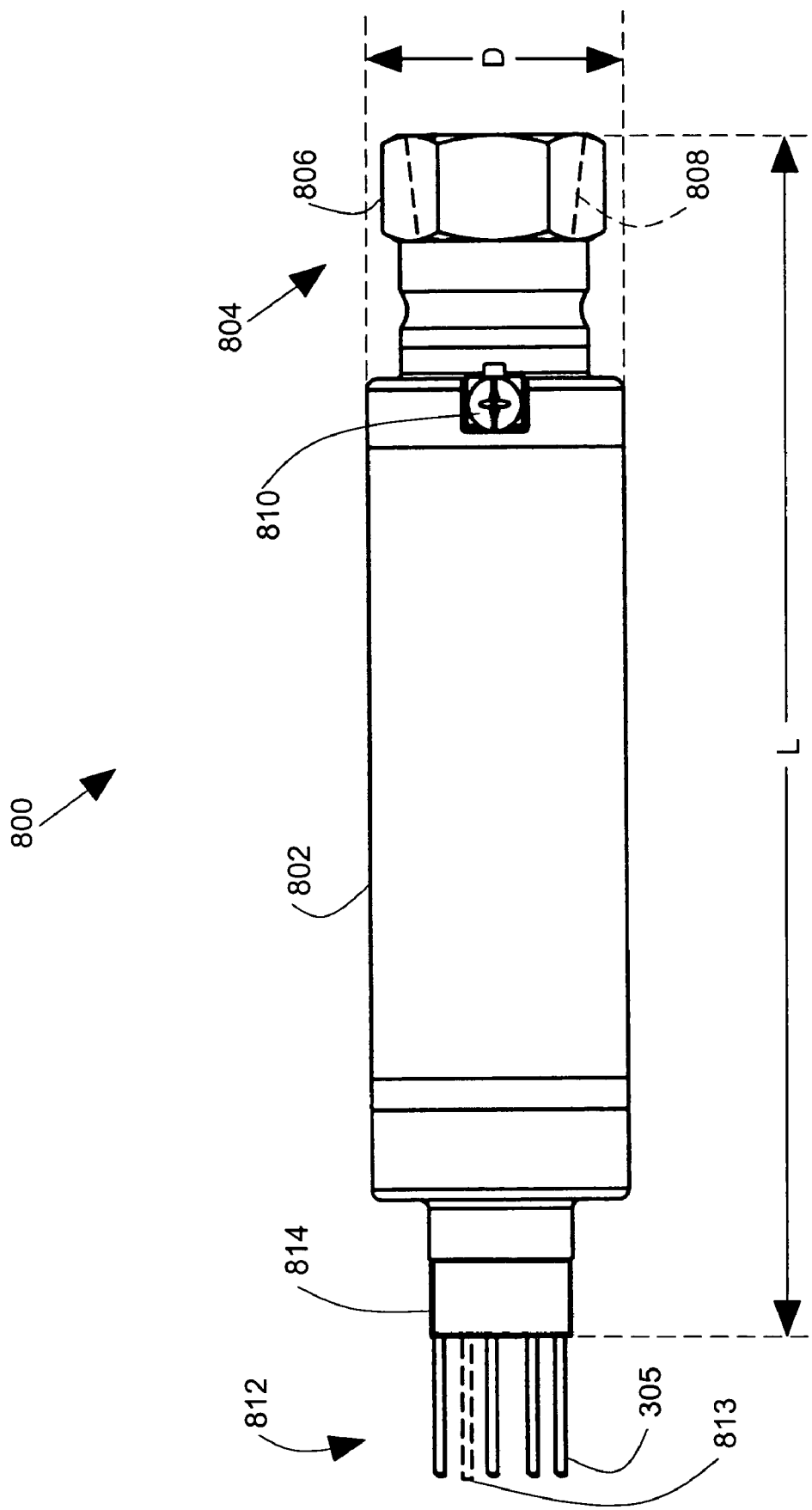
FIG. 8 pictorially illustrates a process variable transmitter.

FIG. 8 pictorially illustrates a process variable transmitter 800. The process variable transmitter 800 includes a generally cylindrical main housing body 802. At a first end of the main body 802, a process inlet 804 includes an external hexagonal surface 806 for gripping with a wrench and an internal threaded hole 808 for threading onto a process pipe (not illustrated) that delivers process fluid to the transmitter 800. A grounding screw 810 is provided on the main body 802 for optionally connecting a grounding wire between the main body process ground.

At a second end of the transmitter 800, four flying leads 812 emerge from a sealed electrical feedthrough connector 814. The flying leads 812 include a LOOP+, LOOP−, CAN and GROUND leads. Flying leads can be conveniently and economically connected to field wiring by using pigtail splices, twist-on wire connector and crimped splicing devices.

The circuit boards inside the housing 802 are sealed from the surrounding atmosphere. The housing 802 serves as an electrostatic shield for low level circuits inside the housing 802. In a preferred arrangement, the housing 802 has a length L that is less than 19 centimeters (7.5 inches) and a diameter D of less than 5 centimeters (2 inches).

The problem of noise coupling in a densely packed transmitter with a CAN transceiver output is solved and a compact transmitter housing can be used.

Figure 9A:
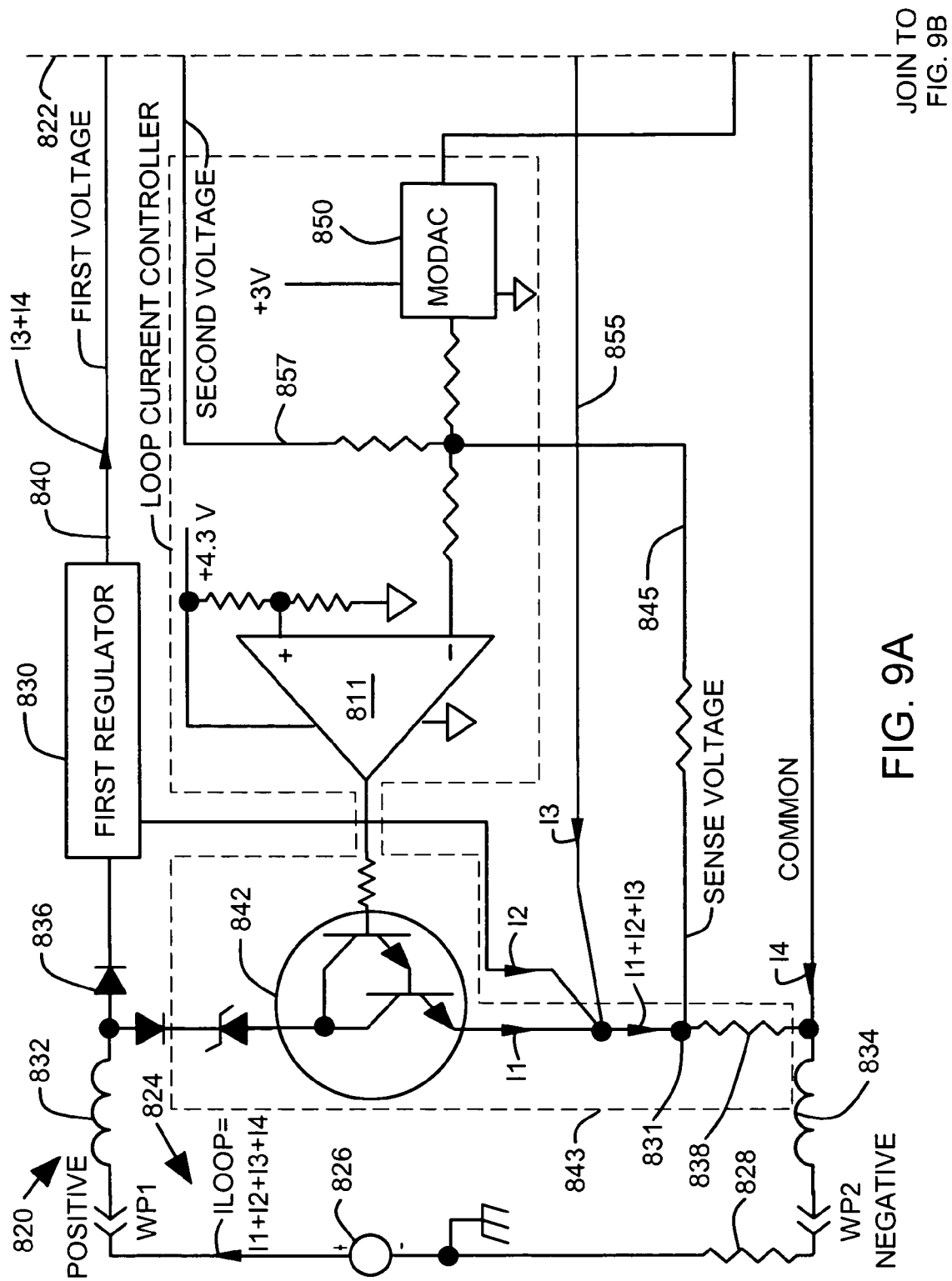
FIGS. 9A-9B illustrate a simplified diagram of a process variable transmitter with stacked power supply features.
Figure 9B:
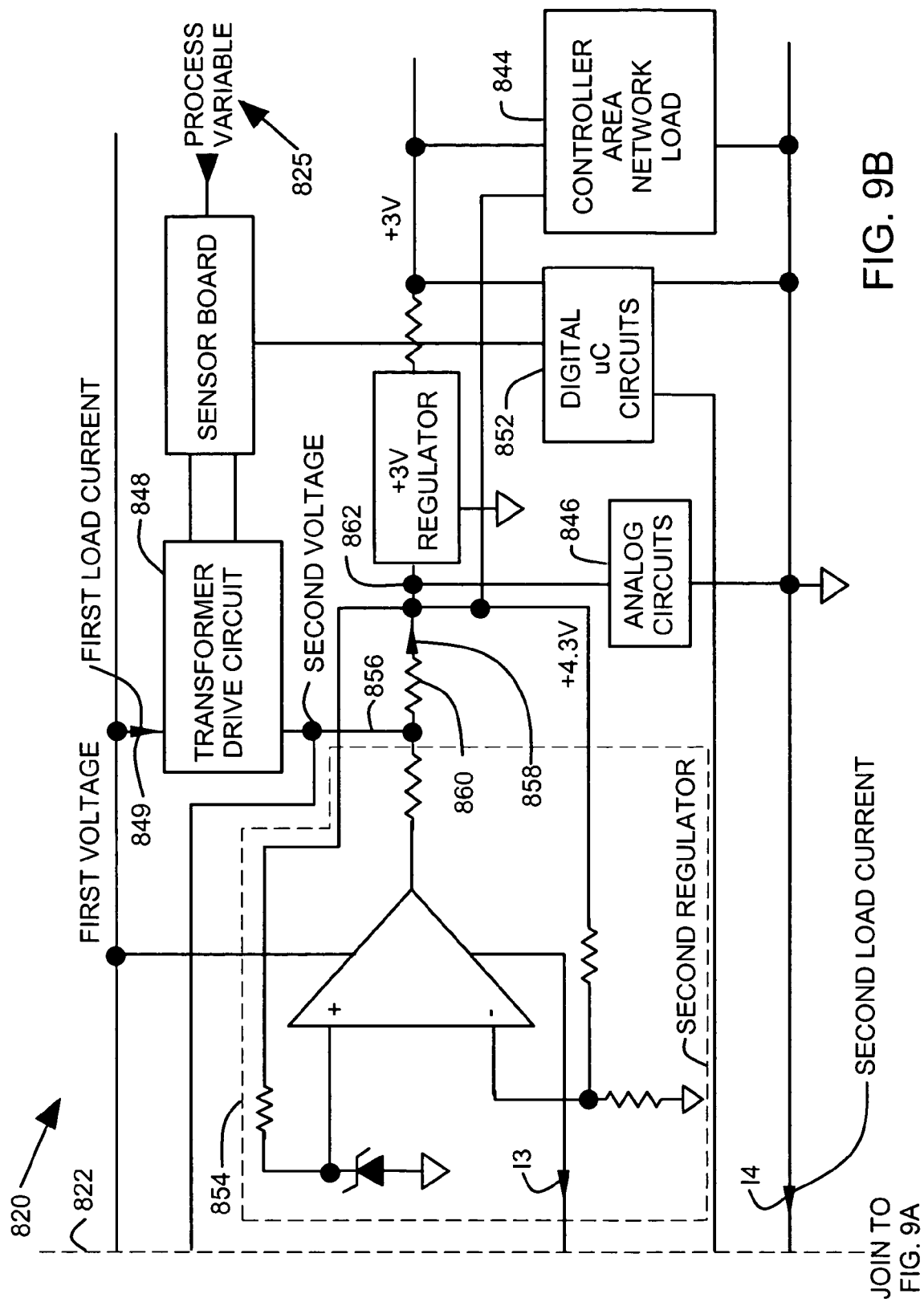

FIGS. 9A-9B, taken together, illustrate a simplified diagram of an embodiment of a process variable transmitter 820 that highlights certain stacked power supply features in the transmitter 820. FIGS. 9A-9B are best understood when joined together along dashed line 822 to form a single diagram of the stacked power supply arrangement.

The transmitter 820 is energized by connecting transmitter leads WP1, WP2 to a two wire, four to twenty milliamperes current loop 824 at the left side of FIG. 9A. The current loop 824 comprises a DC power supply 826 connected in series with a load resistance 828. The transmitter 820 functions as a current controller that controls a loop current ILOOP in the current loop 824 to a current level that represents a process variable 825 sensed by the process variable transmitter 820. In a preferred arrangement, the current loop 824 also carries bidirectional HART communication signals that are superimposed on the loop current ILOOP.

The amount of energization that is available from the current loop 824 for energizing the transmitter 820 is severely limited, and is most severely limited when the loop current ILOOP is at its lower limit of four milliamperes of loop current. At the lower limit, the total amount of current flow through the transmitter is 4.000 milliamperes and cannot be increased (in order to meet transmitter energization needs) because the current level is used as a representation of the process variable 825.

In one embodiment, the current loop 824 can be relied on to provide a minimum voltage at leads WP1, WP2 of no more than about 12 volts under worst case conditions. The voltage supplied by the current loop 824 at leads WP1, WP2 is unregulated, however, and can reach levels as high as about 42.4 volts, depending on variable factors such as regulation of loop supply 826, resistance of loop wiring and the level of the 4-20 mA current.

The electronic circuitry in the transmitter 820 requires power supply voltages that are regulated for reliable operation. Accordingly, the transmitter 820 includes a first voltage regulator 830. In order to maximize the power available to electronic circuitry in the transmitter 820, the first voltage regulator 830 is adjusted to provide the largest possible regulated voltage output 840 that can be reliably generated from the minimum unregulated voltage applied at leads WP1, WP2. Taking into account voltage drops that are used up by RFI chokes 832, 834, reverse polarity protection diode 836 and current sensing resistor 838, the largest possible regulated voltage in one embodiment is about 9.5 volts relative to a current summing node 831, also called RETURN 831. of the 4.000 milliamperes of current available from the current loop 824, only about 3.1 milliamperes of current is available at the first voltage output 840 of the first voltage regulator 830 in this embodiment. The remaining 0.9 milliamperes of current are reserved for maintaining an adequate current through a darlington transistor 842 to ensure that loop current ILOOP can be modulated by the transmitter 820 to produce a +/− 0.5 mA HART signal at a low current of 3.6 mA commonly indicative of low level alarms. A standard established by NAMUR (Normenarbeitsgemeinshaft für Mess- und Regeltechnik der chemischen Industrie) requires that current on a 4-20 mA loop drop to 3.6 mA or lower to indicate an alarm condition of a transmitter. When the transmitter is in this alarm condition, HART modulation can take the current lower by an additional 0.5 mA. The transmitter's power supplies must be in regulation with only 3.1 mA of current in a worst case condition. The transmitter's various power supply functions need to draw less than 3.1 milliamperes, and then the transmitter 820 adjusts a current I1 (through the darlington transistor 842) so that the loop current is at a level in the range of 4-20 milliamperes that indicates the level of the process variable, and also at a level of 3.6 mA that indicates an alarm condition.

In one embodiment, the total power available at the first voltage output 840 is thus about P=VI=(9.5 volts) (3.1 mA)=29.45 milliwatts. This total power available is adequate, in terms of the number of milliwatts, to energize a controller area network (CAN) circuit load 844 along with other transmitter loads such as analog circuit load 846, transformer drive circuit load 848, modac load 850 and digital and microcomputer circuit load 852.

The MODAC 850 is a circuit which combines functions of a MODEM and a DAC. The MODEM senses HART modulation in the sense voltage at node 831. The MODEM can also transmit HART modulation to the darlington transistor 842 through an amplifier 811 (FIG. 9A). The DAC converts a digital representation of the process variable (provided by the microcontroller (uC) circuit 852) to an analog current for use as an input in the loop current controller 843.

It is found, however, that the voltage and current characteristics (load characteristics) of the transmitter circuit loads are not well matched to the voltage and current characteristic (supply characteristic) of the first voltage regulator 830. The transmitter circuit loads require supply currents that add up to about 4.1 milliamperes, greatly exceeding the 3.1 milliamperes available from the first voltage regulator 830. The CAN circuitry load 844, in particular, requires about 0.6 milliamperes under worst case conditions when the external CAN devices draw 0.5 milliamperes. It will be understood by those skilled in the art that the particular levels of current mentioned in this applications are merely exemplary, and that other levels of current can be used in design variations within the scope of the 4-20 mA standard, the NAMUR 3.6 mA standard and the +/- 0.5 mA HART modulation standard. The supply current limit is set so as to not disrupt the functioning of the current loop within the standards.

The transmitter circuit loads (844, 846, 848, 850) also require regulated supply voltages typically in the range of about 5.2 to 3.0 volts, much less that the typical 9.5 volts provided by the first voltage regulator 830.

There is thus an overall mismatch between the voltage and current characteristics of the current loop 824 and the voltage and current characteristics of the transmitter circuit loads 844, 846, 848, 850. The characteristics of the current loop 824 are fixed by long-standing industrial instrument standards that are based on the physics of intrinsically safe circuits and, as a practical matter, can't be changed significantly. The characteristics of the loads 844, 846, 848, 850 are fixed by the available low power integrated circuits, and there is thus no practical opportunity to change load characteristics. This problem is compounded by the fact that the loop current ILOOP must be sensed, and feedback provided, in order to ensure that the loop current corresponds exactly to the process variable 825 that is measured by the transmitter. In order to provide feedback, the current sense resistor 838 is provided to sense current I1 (through darlington transistor 842), current I2 (used to energize first voltage regulator 830) and current I3 (used to energize a second regulator 854). A loop current controller 843 controls the current I1 based on feedback so that the loop current ILOOP is at the correct level to indicate the process variable 825.

The positive lead WP1 and a negative lead WP2 carry the loop current ILOOP in and out of the transmitter 820. Inside the transmitter 820, the loop current ILOOP separates into several current components that include the first current I1, the second current I2, the third current I3, and a fourth current I4. Generally, ILOOP=I1+I2+I3+I4 except for certain small fixed bias currents that can flow, but which do not introduce error in the loop current because calibration effectively cancels them.

The transmitter 820 includes the loop current controller 843. The loop current controller 843 includes the current sense resistor 838. The current sense resistor 838 carries the first current I1, the second current I2, and the third current I3. The current sense resistor 838 develops a sense voltage at node 831 that is fed back along feedback line 845 to an input of the loop current controller 843. The loop current controller 843 controls the first current I1 as a function of both the process variable 825 (an input provided by the MODAC 850) and the sense voltage at node 831. The current sense resistor 838, however, does not carry the current I4. The current I4 bypasses the current sense resistor and returns directly to the negative lead WP2.

The transmitter 820 includes the first voltage regulator 830 that couples to the positive lead WP1 for energization. The first voltage regulator 830 provides the first voltage output 840. The first voltage regulator 830 is energized by current I2. Current I2 passes through the first voltage regulator 830 and return to the negative lead WP2 by passing through the current sense resistor 838.

The transmitter 820 includes a second voltage regulator 854 that couples to the first voltage output 840 for energization. The second voltage regulator 854 provides a second voltage output 856. The second voltage regulator 854 is energized by the third current I3. The third current I3 couples along line 855 from the second regulator 854 to the current sense resistor 838.

The transmitter 820 includes a first load 848 (the transformer drive circuit load 848 which drives a transformer such as shown in FIG. 7) that draws a first load current 849 that flows between the first voltage output 840 and the second voltage output 856.

The transmitter includes a second load that includes the controller area network load 844, as well as loads 846, 850, 852. The second load also includes a number of small fixed bias currents that are returned to common. The second load draws a second load current 858 that flows between the second voltage output 856 and the COMMON lead that connects to the negative lead WP2 through the choke 834. The second load current 858 bypasses the current sense resistor 838.

The second regulator 854 provides only a portion of the second load current 858 (I4). The first load current 849, after flowing through the first load 848, also flows through the second load. The current used by the first load 848 is effectively reused by the second load because the first and second loads are stacked, or in other words, are in series. This reuse of the first load current reduces the amount of current that the second regulator needs to provide. A load current resistor 860 carries the second load current. The second regulator regulates the voltage at node 862 to a fixed voltage which is preferably 4.3 volts. The second voltage 856 thus includes two voltage components. The second voltage 856 includes a regulated component that is typically 4.3 volts. The second voltage 856 also includes a variable voltage component that varies as a function of a voltage drop across the resistor 860. The voltage drop across the resistor 860 thus includes a component that is proportional to the second load current 858.

The loop current controller 843 receives the second voltage 856 on line 857. The loop current controller 843 senses the second voltage 856 to correct the first current I1 for the second load current 858 that bypasses the current sense resistor 838. The loop current controller 843 thus controls current I1 as a function of the process variable, the loop current sensed by resistor 838 and also as a function of the second load current, even though the second load current does not flow through the resistor 838. The stacking of the first and second loads allows the load voltages to be added to better match the available regulated voltage. The stacking of the first and second loads allows a portion of the available regulated current to flow through both the first and second loads, effectively reusing the current, and allowing the total load current to exceed the available regulated current from the loop. The transmitter 820 is thus able to support a controller area network (CAN) load along with other transmitter loads without exceeding the current and voltage limitations of the current loop 824.

Figure 10:
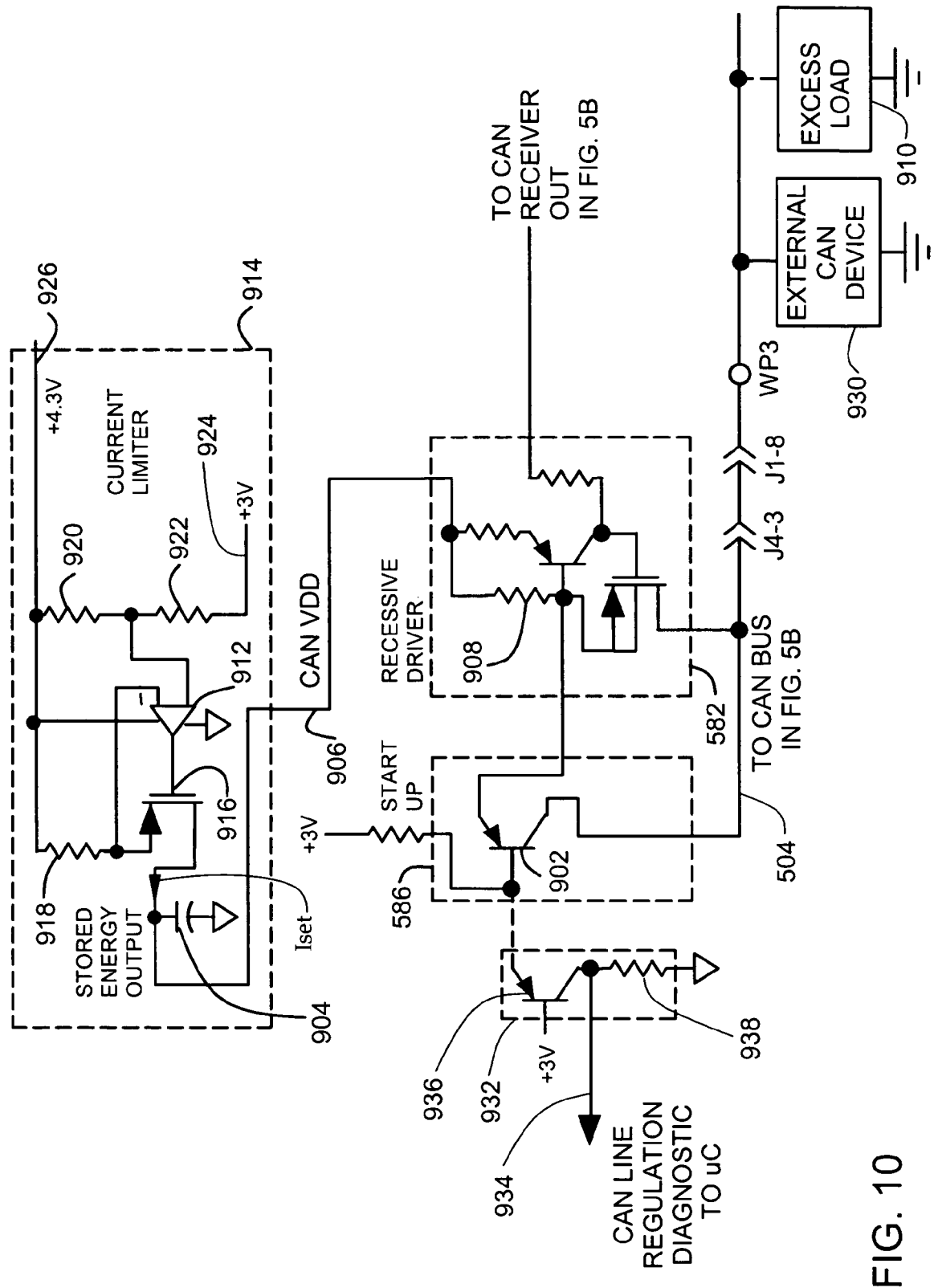
FIG. 10 illustrates a current limiter for a recessive drive of a CAN circuit.

FIG. 10 illustrates a CAN current limiter 914 that limits the amount of current that the recessive driver 582 (also illustrated in FIG. 5A) can supply to the CAN BUS 504 (also illustrated in FIG. 5A). Reference numbers and terminology used in FIG. 10 that are the same as reference numbers and terminology used in FIG. 5B identify the same or similar features.

DC power is provided to external CAN devices (such as an LCD) via the CAN BUS 504 whenever the CAN BUS 504 is in a recessive state (high level, typically +3 volts). During a dominant state (low level, typically +1 volt), a bulk capacitor 904 is charged, and then adequate charge is available for a high current pulse to the CAN BUS 504 once the CAN BUS 504 returns to a recessive state.

The CAN physical layer power is provided via the current limiter 914 that is designed to limit current that the recessive driver 582 draws from the supply conductor 906 (CAN VDD) to a fixed limit. In one preferred embodiment, the fixed limit is 500 microamperes. This current limiter 914 ensures that an overloaded or shorted CAN BUS 504 does not force the transmitter outside of its budgeted quiescent current range on the 4-20 milliampere current loop (such as current loop 824 in FIG. 10). The current limiter 914 limits direct current available to the CAN BUS 504 to prevent an overload or short on the CAN BUS 504 from creating an on scale error on the 4-20 mA transmitter current loop. The bulk storage capacitor 904 stores charge when the CAN BUS 504 is low. When the CAN BUS 504 is high, charge is transferred to an external can device 930 that is energized by the CAN BUS 504.

The current limiter 914 comprises an operational amplifier 912. The operational amplifier 912 is a rail-to-rail input/output (I/O) component which controls a field effect transistor (FET) 916 to establish the current limit. The current limiter 914 comprises a sense resistor 918 that senses current flow from the +4.3V rail 926 to the CAN VDD line 906. The current limiter 914 comprises resistors 920, 922 that form a voltage divider that establishes a current limit reference to the amplifier 912. The current limiter 914 is referenced between the line 924 (+3V) and the line 926 (+4.3V) to ensure an orderly start-up sequence of the transmitter, as described in more detail below in connection with FIG. 13.

In order to provide power to an accessory load on the CAN BUS 504 in an efficient manner, the physical layer stores charge while the CAN BUS 504 is low and transfer charge to the CAN BUS 504 when the CAN BUS 504 switches back high. The bulk capacitor 904 accomplishes this.

Since capacitor 904 is charged via FET 916 which limits current, voltage on capacitor 904 drops momentarily when the CAN BUS 504 pulls high peak current from it. In one embodiment, capacitor 904 is large enough in value to maintain a 3.0 Volt working voltage during communication. This ensures that an external CAN device such as an LCD has sufficient supply voltage to operate. The capacitor 904 is replenished between communication packets.

In order to start-up properly when power is first applied or to recover from a shorted CAN BUS 504, a start up circuit 586 provides an alternate path that provides current to the CAN BUS 504. To meet this requirement, a PNP transistor 902 in start up circuit 586 turns on to provide power to the CAN BUS 504 after the bulk storage capacitor 904 is fully charged. The startup circuit 586 pulls the CAN bus high at start up or upon fault recovery after the bus has been shorted to ground. The startup circuit 586 provides an orderly power up and efficient use of power by allowing the bulk capacitor 904 to fully charge before providing any current to the CAN BUS 504. The CAN physical layer turns the recessive driver 582 off when the CAN BUS 504 is low to conserve current. This poses a problem at start up or after the bus has been shorted to ground. Since the bus is low in either of these cases, the recessive driver 582 will be turned off. Nothing would pull the bus high to start it up or recover form a shorted condition. The bipolar PNP transistor 902 provides the pull up path to perform this function. The emitter of the transistor 902 is connected to line 906 (CAN VDD) by way of the resistor 908, the base of transistor 902 is connected to +3V (either directly as shown or through a resistor) and the collector of transistor 902 is connected to the CAN BUS 504. In this embodiment, once line 906 reaches about 3.6 volts, transistor 902 will turn on and source current to the CAN BUS 504. This creates a 3.6 Volt rail 906 which is sufficient for the physical layer requirements. Once the rail 906 is at 3.6 Volts, capacitor 904 is fully charged so there is no where to store additional charge. It is acceptable to supply current to the CAN BUS 504 as a pull up mechanism.

If the CAN BUS 504 is loaded by an excessive load 910, current will flow to ground but line 906 will be fixed at 3.6 Volts. If there is no DC load on the bus the current will flow through transistor 902 base/emitter junction and into the +3.0 Volt rail to be reused. An additional benefit is that the physical layer draws a fixed current at all times so that the DC power limit circuit is not in a dynamic application and thereby keeping switched loads associated with the serial bus isolated from the +4.3 volt internal rail and from the 4-20 mA loop regulation circuitry. This allows the use of a relatively slow, low power operational amplifier 912.

An optional diagnostic circuit 932 can be added to the circuit shown in FIG. 10. The diagnostic circuit 932 couples to CAN power supply circuitry and provides a diagnostic output 934 that indicates the state of regulation of the power supplied to the CAN bus on line 504. If there is an excessive load 910 (such as excessive cable capacitance), the diagnostic output 934 can alert an operator of the problem. The load is excessive when it exceeds the 0.5 mA current limit Iset that is set by the current limiter 914. The diagnostic output 934 preferably couples to microcontroller that is part of the digital uC circuits 852 in FIG. 9B.

In a preferred arrangement, the diagnostic circuit 932 comprises a PNP transistor 936 with an emitter connected to the base of transistor 902, a base connected to +3V and a collector connected to a resistor 938 that couples to DC common. The diagnostic output 934 is connected to the junction of the resistor 938 and the collector of transistor 936.

Figure 11:
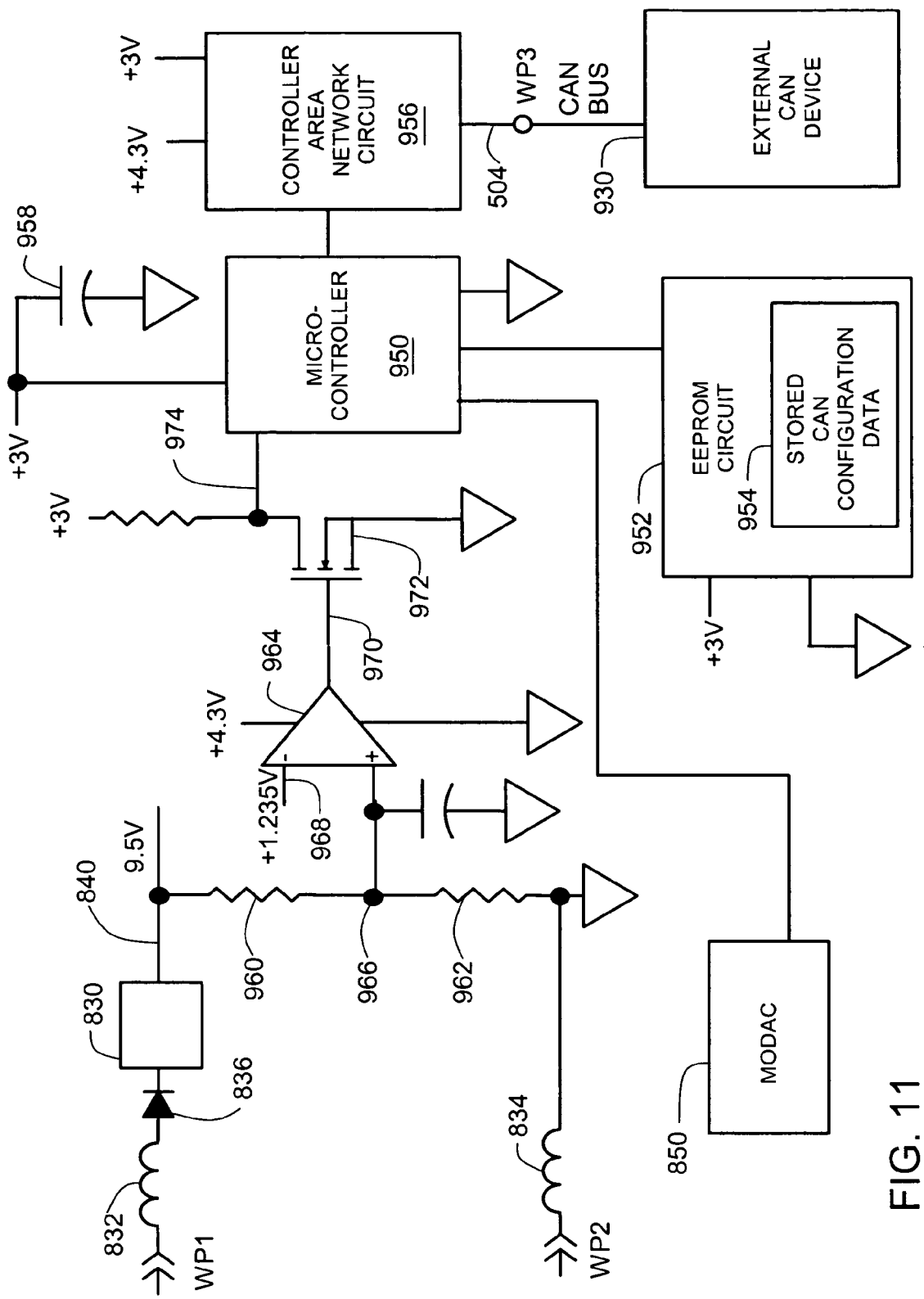
FIG. 11 illustrates power supply circuitry used in storing CAN configuration data.

FIG. 11 illustrates power supply circuitry that is adaptable for use in transmitters such as those illustrated in FIGS. 9A-9B, 10. Reference numbers used in FIG. 11 that are the same as reference numbers used in FIGS. 9A-9B, 10 refer to the same or similar features.

A CAN external device 930 has certain features that can be programmed or configured at start-up, and that can be re-configured from time to time during use. CAN configuration data is transferred to the CAN external device 930 over the CAN BUS 504 to configure the CAN external device 930.

CAN configuration data is transmitted over the two wire 4-20 loop that powers the transmitter using the HART protocol. A modac 850 receives HART messages that include the CAN configuration data, demodulates the HART messages, and provides CAN configuration data to the microcontroller 950. The microcontroller 950 transmits the CAN configuration data to an EEPROM circuit 952 where it is non-volatilely stored as stored CAN configuration data 954. Once the CAN external device 930 is configured, then another HART device (typically a process control system) connected to the two wire 4-20 milliampere loop can communicate with the CAN external device 930.

Each time that the CAN BUS 504 is restarted, the microcontroller 950 automatically retrieves the current version of CAN configuration data from the EEPROM circuit 952 and then uses the CAN circuit 956 to transmit the current version of CAN configuration data to the external CAN device 930.

From time to time, there can be momentary power outages ("brown-outs") on the two wire 4-20 mA loop that energizes the transmitter. If one of these brown-outs occurs while the microcontroller 950 is writing CAN configuration data to the EEPROM 952, the writing of data may not be completed, and the stored CAN configuration 954 can be corrupted or obsolete. After this happens, the process control system may subsequently attempt to communicate with the external CAN device 930 assuming that the CAN external device 930 is currently configured, when in fact the CAN external device 930 has an obsolete or corrupted configuration. Malfunction of the control system can result from this mismatch of assumed and actual CAN configuration data. In order to reduce the possibility of such a mismatch, circuitry described below is provided to prevent such a mismatch.

The +3V power supply rail is provided with an energy storage capacitor 958 that the +3V supply voltage drops slowly and maintains the +3V supply long enough to fully complete a write of CAN configuration data to the EEPROM 952 after the loop energization is removed. A first regulated voltage 840 (+9.5V) is provided with only a small energy storage so that the +9.5V supply drops quickly when the loop energization is removed.

The +9.5V supply is sensed by a resistive voltage divider that includes resistors 960, 962. A comparator 964 has a first input connected to an output 966 of the resistive voltage divider, and has a second input connected to a fixed reference voltage 968. The comparator 964 compares the output 966 of the resistive voltage divider to the fixed reference voltage 968. A comparator output 970 indicates when the loop energization has been interrupted. The comparator output 970 couples to a FET 972 that provides a brown-out output 974 to the microcontroller 950 that is actuated when loop energization is interrupted.

When the brown-out output 974 is actuated, the microcontroller 950 responds by taking two actions. In a first action, the microcontroller 950 sets a warning flag, using HART communication, to the process control system. The flag remains set, and the next time there is a HART communication, the flag is included in the communication, alerting an operator that there has been a brownout condition present. The warning flag alerts the process control system to the possibility that the CAN configuration data may have been corrupted by a brown-out. After power is restored, the process control system responds by repeating transmission of CAN configuration data. In a second action, the microcontroller 950 responds by delaying other microcontroller tasks and quickly completing writing of stored CAN configuration data 954 while the +3V supply is still available due to the energy storage in capacitor 958. These two actions ensure that the configuration of external CAN devices is not obsolete or corrupted during a brown-out.

Figure 12:
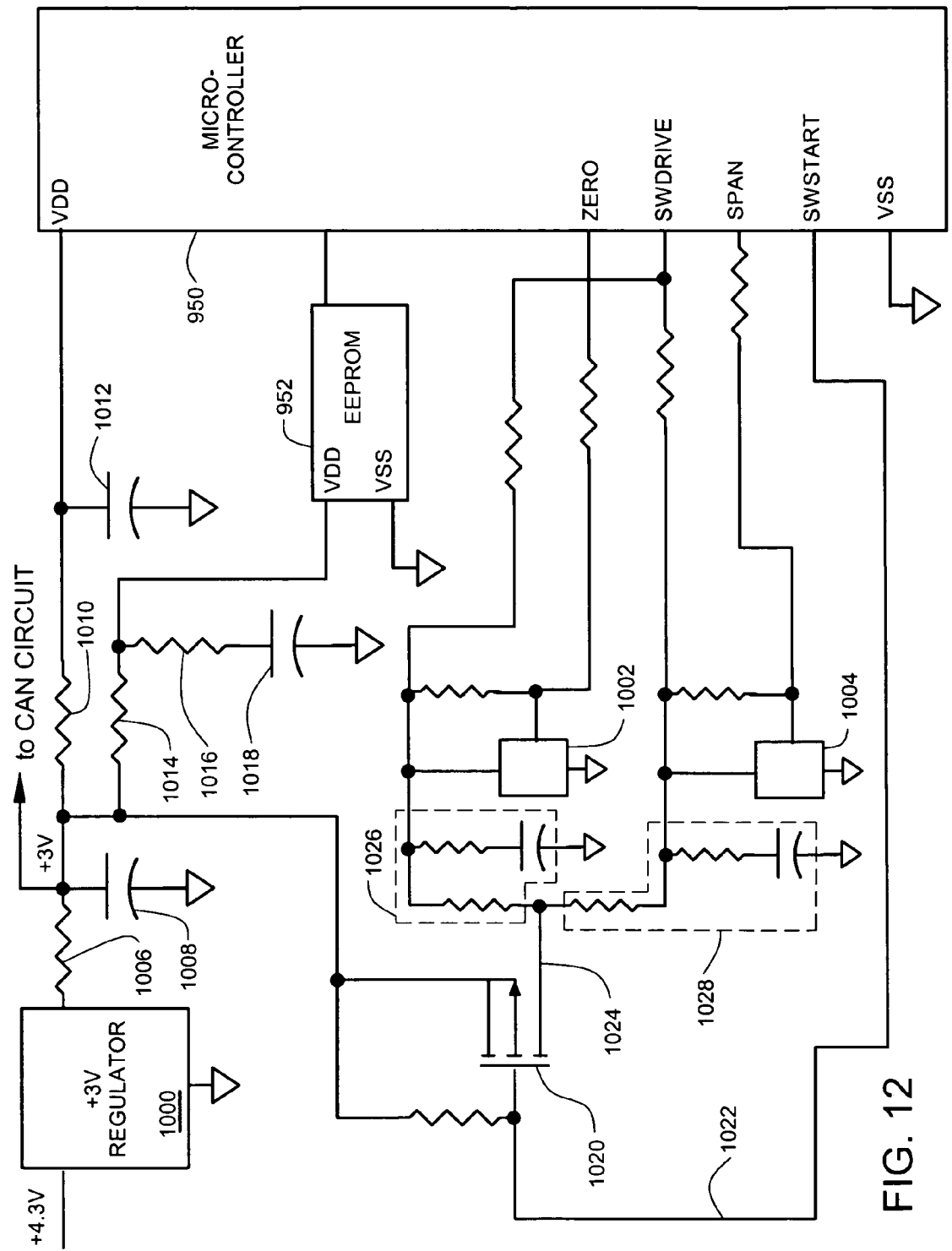
FIG. 12 illustrates power supply circuitry that isolates spikes.

FIG. 12 illustrates power supply circuitry that is adaptable for use in transmitters such as those illustrated in FIGS. 9A-9B, 10, 11. Reference numbers used in FIG. 12 that are the same as reference numbers used in FIGS. 9A-9B, 10, 11 refer to the same or similar features.

The digital and microcontroller circuits (such as digital and microcontroller circuits 852 in FIG. 9B) in a transmitter draw currents from a +3V power supply that include relatively large current spikes. These relatively large current spikes can cause instability in the output of the +3V voltage regulator circuit 1000. A current spike from one circuit can act as a noise input on other circuits connected to the +3V supply. In particular, the microcomputer 950, the EEPROM 952 and Hall effect switches 1002, 1004 tend to generate noise spikes.

The +3V regulator 1000 provides a regulator output that is coupled by resistor 1006 to the +3V bus. The resistor 1006 is typically about 10 ohms. The +3V rail is bypassed by an energy storage capacitor 1008. The energy storage capacitor 1008 is typically about 22 microfarads. The arrangement of the resistor 1006 and the capacitor 1008 form an RC low pass filter that tend to detune or decouple the regulator 1000 from its load on the +3V bus. The arrangement with the RC filter tends to improve the stability of the regulator output.

The +3V bus is coupled to the microcontroller by a low pass RC filter that comprises resistor 1010 and capacitor 1012. The resistor 1010 is typically 150 ohms and the capacitor 1012 is typically 1 microfarad. This arrangement tends to isolate the +3V bus from noise spikes generated by the microcontroller 950 and vice versa.

The +3V bus is coupled to the EEPROM 952 by a low pass RC filter that comprises resistors 1014, 1016 and capacitor 1018. The resistor 1014 is typically 270 ohms and the capacitor 1018 is typically 47 microfarad. The resistor 1016 is typically 47 ohms and limits current to the capacitor 1018. This arrangement tends to isolate the +3V bus from noise spikes generated by the EEPROM 952 and vice versa.

The +3V bus is selectively coupled to the Hall effect switches 1002, 1004 by FET 1020. The microcontroller 950 actuates an output SWSTART on line 1022 to turn on the FET 1020 and couple the +3V bus to a line 1024. RC networks 1026, 1028 couple the energization on line 1024 to the Hall effect switches 1002, 1004. The Hall effect switches 1002, 1004 can be actuated by a handheld magnet in order to manually set span and zero setting for the loop current. The Hall effect switches 1002, 1004 tend to draw large current spikes from the power rail upon actuation.

Figure 13:
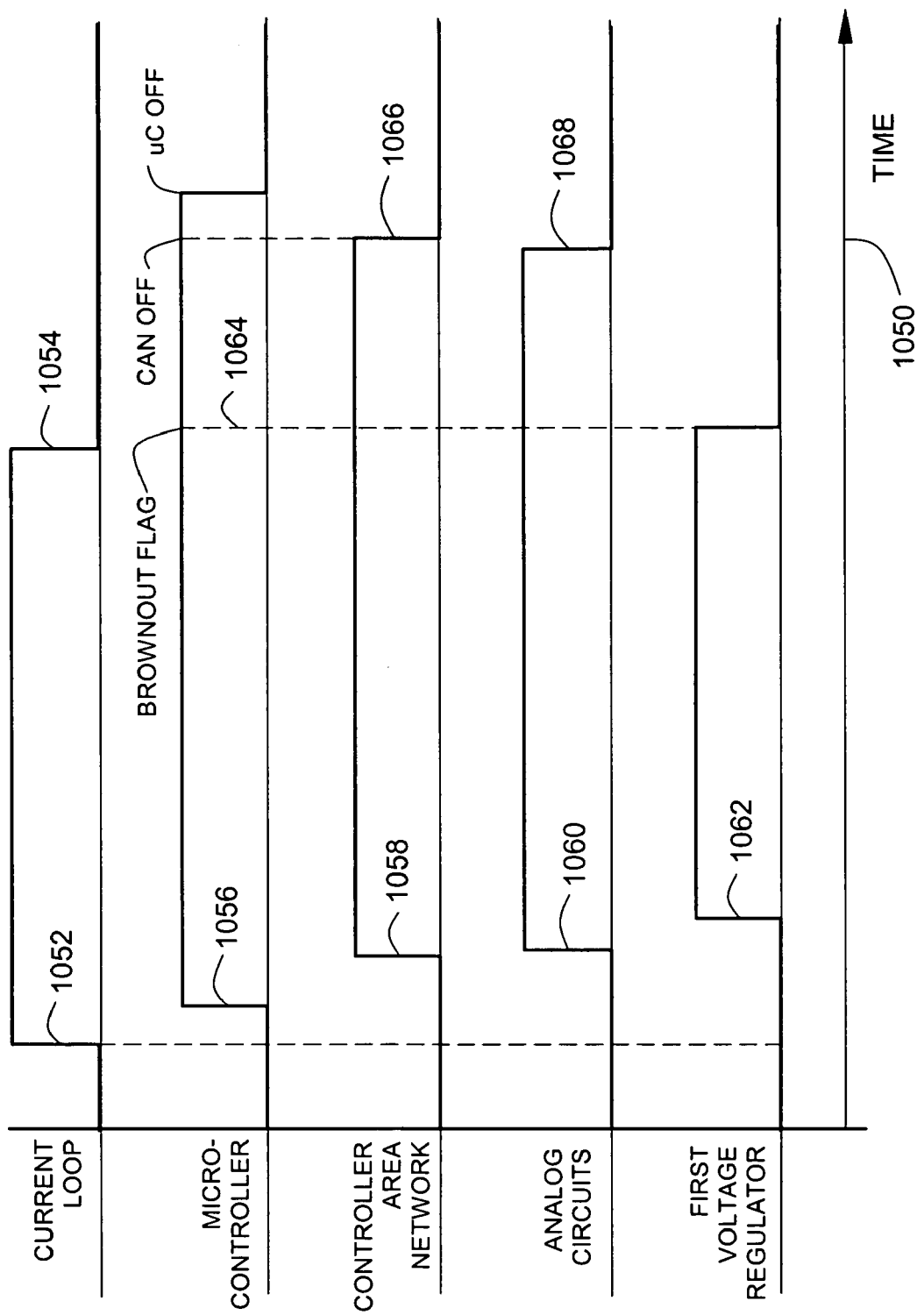
FIG. 13 illustrates a simplified timing diagram of energization of a transmitter that includes a CAN circuit.

FIG. 13 illustrates a simplified timing diagram of energization of transmitter circuitry, such as the transmitter circuitry illustrated in FIGS. 9A, 9B, 11, 12. In FIG. 13, a horizontal axis 1050 represents time and vertical axes represent whether full energization is present for each of the signals represented.

A "high" level indicates that a signal has reached a full energization level, and a "low" level indicates less than full energization.

The timing diagram illustrates sequencing of full energization of supply rails in a transmitter so that distribution of energy during start up and shut down is biased toward energizing a microcontroller early during start up and also biased toward de-energizing the microcontroller late during shut down. The microcontroller includes a software "boot up" sequence that is longer than the start up sequence for other circuits in the transmitter.

It is important to get the microcontroller controller booted up and controlling a MODAC before the 4.3 V power supply is up to its full value. This arrangement avoids having the loop current controller draw an initial spike of overcurrent that could be misinterpreted by the external control loop as an alarm signal.

It is also important for the microcontroller to complete storage of CAN configuration data when there is a brown-out or energization is removed. As explained above in connection with FIG. 11, collapse of the first output (+9.5V) signals the microcontroller to complete storage of CAN configuration data, and the large capacitance 958 keeps the microcontroller 950 operating long enough to complete storage before the +3V rail drops so low that the microcontroller can no longer work.

A sequence is illustrated for a process control loop that is initially off, then brought to full energization at 1052 and then drops below full energization at 1054. The transition at 1054 is an example of a brown-out or of a disconnect of loop energization.

When the loop is first energized at 1052, the regulator which supplies energization to a microcontroller (for example, the regulator 1000 in FIG. 12 or the +3V regulator in FIG. 9B) charges relatively large capacitances (for example, capacitors 1008, 1012, 1018 in FIG. 12) so that the input supply to the regulator (for example, +4.3V rail in FIGS. 9B, 12) is heavily loaded. The output of the +3V regulator goes into regulation at 1056 in FIG. 13. Next, in sequence, the +4.3V power to the CAN circuit and analog circuits at 1058, 1060. Lastly, the first regulated voltage (+9.5V) goes into regulation at 1062.

When full power to the loop is lost at 1054, the +9.V rail drops quickly and the microcontroller receives a brownout flag at 1064 signalling the microcontroller to complete any ongoing CAN configuration storage. The circuitry shown in FIG. 11 illustrates how such a brownout flag is generated. Next in sequence, the 4.3V rail falls and CAN circuitry and analog circuitry lose energization at 1066, 1068. Finally, the microcontroller loses its energization last at 1070.

Although the present invention has been described with reference to preferred embodiments, workers skilled in the art will recognize that changes may be made in form and detail without departing from the scope of the invention.

What is claimed is:

1. A transmitter that controls a loop current, comprising:
   positive and negative leads carrying the loop current, the loop current including first, second, third and fourth currents in the transmitter;
   a loop current controller that includes a resistor that carries the first current and that controls the first current as a function of both a process variable and a sense voltage at the resistor;
   a first regulator coupling to the positive lead, providing a first voltage, and coupling the second current through the resistor;
   a second regulator coupling to the first voltage, providing a second voltage, and coupling the third current through the resistor;
   a first load that carries a first load current between the first voltage and the second voltage;
   a second load that includes a controller area network load, and that couples a second load current between the second voltage and the negative lead, the second load current bypassing the resistor; and
   the loop current controller sensing the second voltage to correct the first current for the load current that bypasses the resistor.

2. The transmitter of claim 1 wherein the first and second loads are stacked in an electrical series circuit, and at least a portion of the first load current passes through the second load.

3. The transmitter of claim 1 wherein the sum of the first load current and the second load current exceed a lower limit of the loop current.

4. The transmitter of claim 1 wherein the first and second load have load characteristics that are not matched to the supply characteristics of the loop current.

5. The transmitter of claim 1 wherein the loop current controller controls the first current based on feedback so that the loop current indicates the process variable.

\* \* \* \* \*